US009667382B2

(12) United States Patent
Liew et al.

(10) Patent No.: US 9,667,382 B2
(45) Date of Patent: May 30, 2017

(54) NETWORK-CODED MULTIPLE ACCESS

(71) Applicant: The Chinese University of Hong Kong, Sha Tin, New Territories (CN)

(72) Inventors: Soung Chang Liew, Sha Tin (CN); Lu Lu, Sha Tin (CN); Lizhao You, Sha Tin (CN)

(73) Assignee: The Chinese University of Hong Kong, Shatin, N.T., Hong Kong (CN)

( * ) Notice: Subject to any disclaimer, the term of this patent is extended or adjusted under 35 U.S.C. 154(b) by 267 days.

(21) Appl. No.: 14/458,985

(22) Filed: Aug. 13, 2014

(65) Prior Publication Data

US 2015/0049751 A1    Feb. 19, 2015

Related U.S. Application Data

(60) Provisional application No. 61/865,391, filed on Aug. 13, 2013.

(51) Int. Cl.
*H04L 12/28* (2006.01)
*H04L 1/00* (2006.01)

(52) U.S. Cl.
CPC .......... *H04L 1/0048* (2013.01); *H04L 1/0054* (2013.01); *H04L 1/0076* (2013.01); *H04L 2001/0097* (2013.01)

(58) Field of Classification Search
CPC .... H04W 24/00; H04L 1/0047; H04L 1/0048; H04L 1/005
See application file for complete search history.

(56) References Cited

U.S. PATENT DOCUMENTS

| 2006/0229017 | A1* | 10/2006 | Larsson | H04B 1/1027 |
| | | | | 455/63.1 |
| 2006/0251016 | A1* | 11/2006 | Lee | H04L 1/0021 |
| | | | | 370/329 |
| 2007/0275656 | A1* | 11/2007 | Chang | H04L 1/08 |
| | | | | 455/9 |
| 2008/0310409 | A1* | 12/2008 | Larsson | H04L 1/004 |
| | | | | 370/389 |
| 2014/0056334 | A1* | 2/2014 | Khina | H04L 25/0204 |
| | | | | 375/211 |
| 2014/0307841 | A1* | 10/2014 | Hoshyar | H04L 27/2647 |
| | | | | 375/350 |

OTHER PUBLICATIONS

Katti et al., "XORs in the Air: Practical Wireless Network Coding", SIGCOMM'06, Sep. 11-15, 2006, Pisa, Italy.
(Continued)

*Primary Examiner* — Kevin C Harper
(74) *Attorney, Agent, or Firm* — Kilpatrick Townsend & Stockton LLP

(57) ABSTRACT

Systems and methods described herein include a first wireless local area network ("WLAN") system that jointly exploits physical-layer network coding ("PNC") and multiuser decoding ("MUD") to boost system throughput. This multiple access mode is referred to as Network-Coded Multiple Access ("NCMA"). NCMA allows multiple nodes to transmit simultaneously to the access point ("AP") to boost throughput in a non-relay environment. When two nodes A and B transmit to the AP simultaneously, the AP desires to obtain both packet A and packet B rather than their network-coded packet.

18 Claims, 16 Drawing Sheets

(56) References Cited

OTHER PUBLICATIONS

Katti et al., "Embracing Wireless Interferences: Analog Network Coding", SIGCOMM'07, Aug. 27-31, Kyoto, Japan.
Katti et al., "Symbol-level Network Coding for Wireless Mesh Networks", SIGCOMM/08, Aug. 17-22, 2008, Seattle, Washington, USA.
Khabbazian et al., "MAC Design for Analog Network Coding", FOMC'11, Jun. 9, 2011, San Jose, California, USA.
Li et al., "CRMA: Collision-Resistant Multiple Access", MobiCom'11, Sep. 19-23, 2011, Las Vegas, Nevada, USA.
Lu et al., "Implementation of Physical-layer network coding", *Physical Communication* (2012), 14 pages.
Rozner et al., "ER: Efficient Retransmission Scheme for Wireless LANs", CoNEXT'07, Dec. 10-13, 2007, New York, NY, USA.
Zhang et al., "Physical-Layer Network Coding", MobiCom'06, Sep. 23-29, 2006, Los Angeles, California, USA.

\* cited by examiner

| Packet Index | $Eq^A$ | $Eq^{A \oplus B}$ | $Eq^B$ |
| --- | --- | --- | --- |
| 1 | $C_1^A$ | $C_1^{A \oplus B}$ | $C_1^B$ |
| 2 | $C_2^A$ | $\varnothing$ | $C_2^B$ |
| 3 | $C_3^A$ | $C_3^{A \oplus B}$ | $\varnothing$ |
| 4 | $\varnothing$ | $C_4^{A \oplus B}$ | $C_4^B$ |
| 5 | $C_5^A$ | $\varnothing$ | $\varnothing$ |
| 6 | $\varnothing$ | $\varnothing$ | $C_6^B$ |
| 7 | $\varnothing$ | $C_7^{A \oplus B}$ | $\varnothing$ |
| 8 | $\varnothing$ | $\varnothing$ | $\varnothing$ |

*FIG. 3*

Example: Decoding $M^B$, based on $M^A$ and $M^A \oplus M^B$, with $L = 3$

| Packet Index | $Eq^A$ | $Eq^{A \oplus B}$ | $Eq^B$ |
|---|---|---|---|
| 1 | $C_1^A$ | | |
| 2 | $C_2^A$ | $C_2^{A \oplus B}$ | |
| 3 | $C_3^A$ | | $C_3^B$ |
| 4 | $C_4^A$ | $C_4^{A \oplus B}$ | $C_4^B$ |
| 5 | $C_5^A$ | | |

Erasure decoding and reconstruct A ↑

| Packet Index | $Eq^A$ | $Eq^{A \oplus B}$ | $Eq^B$ |
|---|---|---|---|
| 1 | $C_1^A$ | | |
| 2 | | $C_2^{A \oplus B}$ | |
| 3 | | | $C_3^B$ |
| 4 | $C_4^A$ | $C_4^{A \oplus B}$ | $C_4^B$ |
| 5 | $C_5^A$ | | |

Network decoding B using XOR information →

| Packet Index | $Eq^A$ | $Eq^{A \oplus B}$ | $Eq^B$ |
|---|---|---|---|
| 1 | $C_1^A$ | | $(C_1^B)$ |
| 2 | $C_2^A$ | $C_2^{A \oplus B}$ | $C_2^B$ |
| 3 | $C_3^A$ | | $C_3^B$ |
| 4 | $C_4^A$ | $C_4^{A \oplus B}$ | $C_4^B$ |
| 5 | $C_5^A$ | | $(C_5^B)$ |

Erasure decoding and reconstruct B ↑

| Packet Index | $Eq^A$ | $Eq^{A \oplus B}$ | $Eq^B$ |
|---|---|---|---|
| 1 | $C_1^A$ | | |
| 2 | $C_2^A$ | $C_2^{A \oplus B}$ | $C_2^B$ |
| 3 | $C_3^A$ | | $C_3^B$ |
| 4 | $C_4^A$ | $C_4^{A \oplus B}$ | $C_4^B$ |
| 5 | $C_5^A$ | | |

*FIG. 4*

NETWORK-CODED MULTIPLE ACCESS

CROSS-REFERENCES TO RELATED APPLICATIONS

This application is a non-provisional application of and claims priority to U.S. Provisional Application No. 61/865,391, filed on Aug. 13, 2013, the entire contents of which are herein incorporated by reference for all purposes.

SUMMARY

Embodiments of the techniques described herein include a two-layer decoding system and method configured to receive and recover a pair of overlapping packets that are transmitted concurrently from multiple users to a network element, such as an access point ("AP"), in a wireless local area network ("WLAN"). The pair of overlapping packets is communicated to a physical layer decoding unit in the network element. The decoding unit in the physical layer includes two channel decoders: (1) a multiuser decoding ("MUD") channel decoder; and (2) a physical-layer network coding ("PNC") channel decoder. The MUD channel decoder is adapted to attempt to decode each individual packet of the pair of overlapping native packets, and the PNC channel decoder is adapted to attempt to decode a network-coded packet from the pair of native packets. The native packets may then be recovered based on the results obtained from the physical layer decoding unit.

The recovery process is complete if the MUD channel decoder is able to decode both of the native packets. If only one of the native packets can be recovered, a network-coded packet in the physical layer of the network element can be used in conjunction with that decoded native packet to generate the other native packet using a process referred to as "physical layer bridging." When a pair of user nodes transmits many packets in succession, it is possible that some of the native packets will not be decoded correctly while the corresponding network-coded packets at the same positions in time can be recovered. These network-coded packets can then be used with the available decoded native packets (at other positions in time) to decode the missing native packets.

In some embodiments, a message from each source node may include transmitting a succession of native packets (i.e., a message from a source node is carried in multiple packets transmitted by the source). For a pair of native packets simultaneously transmitted by the two source nodes, if both of the native packets cannot be decoded, but the network-coded packet can be recovered in the physical layer, then the lone network-coded packet can be used to recover the missing native packets in the media access control ("MAC") layer of the network element as long as enough native packets in other positions in time can be decoded. This lone network-coded packet is forwarded from the physical layer to the MAC layer, and the missing native packets can be recovered from a combination of decoded lone network-coded packets and native packets in the overall messages from the two sources using "MAC layer bridging." In some embodiments, MAC layer bridging involves decoding enough packets in a message from one of the source user nodes to derive the remaining missing packets of the overall message in the MAC layer through MAC-layer decoding. The recovered message can then be used with the network-coded packets to recover the missing native packets in the overlapping native packets. For instance, the remaining missing packets from previous transmissions of a message from a first source node can be derived by re-encoding the decoded packets that have been received from previous transmissions. In some embodiments, the MAC layer decoder uses an erasure channel code including either a Reed Solomon code or a rateless channel code, and the complementary network-coded packet is a bitwise XOR function of the pair of overlapping packets.

Accordingly, a network-coded packet can be used at a physical layer decoding unit as a bridge to derive a missing packet of the pair of native packets when its counterpart packet is decoded, and network-coded packets can be used at the MAC layer as a bridge to derive missing native packets when enough native packets in the two messages of the sources have been decoded.

BRIEF DESCRIPTION OF THE DRAWINGS

FIG. 3 depicts an example of a PHY-layer packet reception pattern for concurrently transmitted packets according to some embodiments.

FIG. 4 depicts the NCMA decoding process with L=3 in the RS code according to some embodiments.

DETAILED DESCRIPTION

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

The techniques described herein include a wireless local area network (WLAN) system that uses physical-layer network coding ("PNC") and multi-user decoding ("MUD") to boost system throughput. This multiple access technique is referred to herein as Network-Coded Multiple Access ("NCMA"). Generally, network coding plays a major role in relay networks (wired or wireless) in which network coding is performed by the relays. The NCMA techniques described herein provide a multiple access scheme that establishes the usefulness of PNC in a non-relay setting. NCMA allows multiple nodes to transmit simultaneously to the access point ("AP") to boost throughput. When two nodes A and B transmit to the AP simultaneously, the AP desires to obtain both packet A and packet B rather than their network-coded packet. According to some embodiments, PNC which extracts packet A⊕B can still be useful in the non-relay setting by devising a two-layer decoding approach amenable to real-time implementation.

Embodiments of the NCMA techniques described herein provide a two-layer decoding method that exploits PNC and/or MUD decoding at the physical ("PHY") layer, and erasure channel decoding at the media access control ("MAC") or upper layer. Some features of the NCMA techniques may include: (1) PHY-layer bridging and MAC-layer bridging and decoding; (2) reduced complexity multi-user convolutional-code decoders for MUD and PNC PHY-layer decoding; and (3) interacting multi-equation systems for MAC-layer decoding. In some embodiments, the NCMA techniques can boost throughput by 100% in the medium-high SNR regimes (≥10 dB) with respect to the traditional single-user transmission system (e.g., 802.11 WLAN).

1. Introduction

Figure 1A:
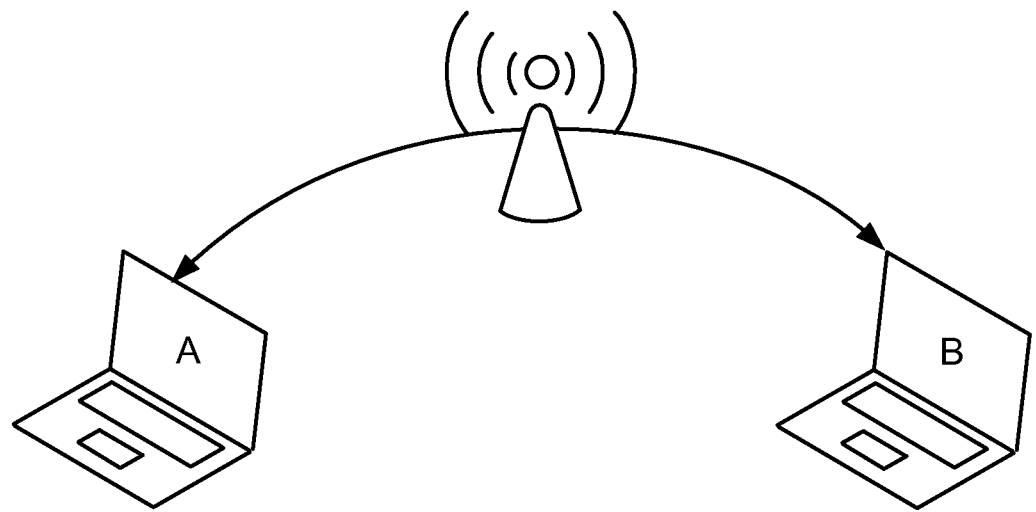
FIGS. 1A-B depict traffic patterns of: (a) a two-way relay network; and (b) a multiple-access WLAN according to some embodiments.

Relay networks have primarily been the focused of physical-layer network coding (PNC). NCMA, as described herein, is a multiple access scheme that establishes the usefulness of PNC in a non-relay setting. FIG. 1A illustrates the application of PNC in a two-way relay network ("TWRN"). Here, two nodes A and B wish to send messages to each other via a relay R. With PNC, nodes A and B send their packets, A and B, to relay R simultaneously. Relay R then derives a network-coded packet (e.g., a bit-wise XOR packet A⊕B) from the received overlapping signals. It then broadcasts A⊕B to nodes A and B. With A⊕B, node A recovers packet B using self-information: B=A⊕(A⊕B); and likewise for node B. In this way, only two time slots are needed for the two-packet exchange, and 100% throughput improvement can be achieved with respect to the 4-timeslot traditional relaying scheme. In some instances, when using nested lattice codes (rather than simple bit-wise XOR), PNC can approach capacity to within ½ bit.

Figure 1B:
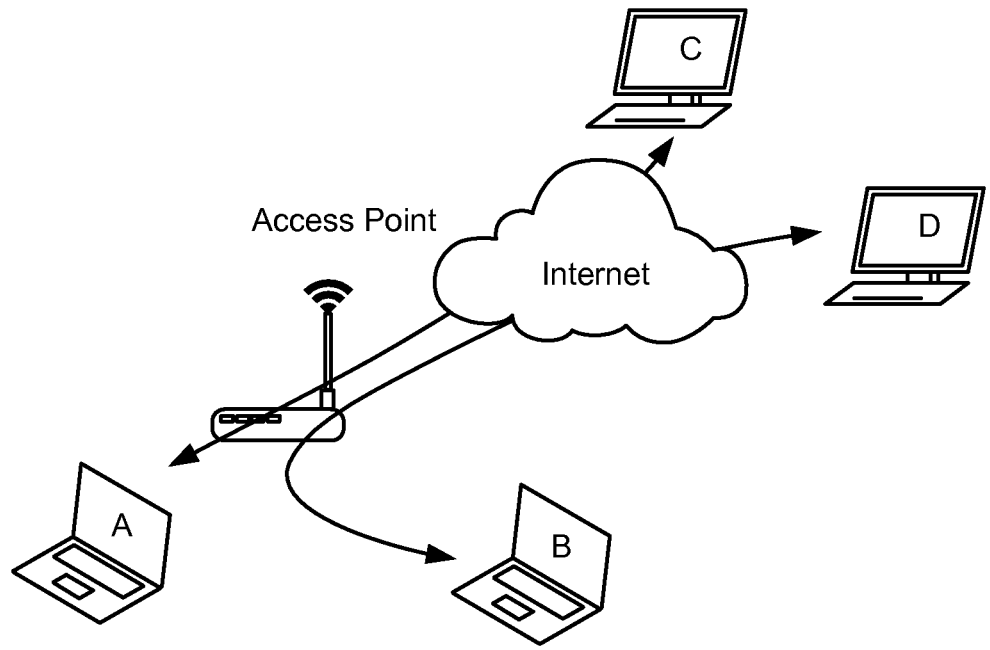

In a WLAN setting, as shown in FIG. 1B, instead of a relay, an access point ("AP") is used. Oftentimes, nodes A and B are not interested in communicating with each other. Rather, they want to communicate with some other nodes, e.g., on the Internet. In such scenarios, the communicating counterpart of A is C, not B. Relay packet A⊕B by the AP to node C may not be useful because P lacks packet B. For compatibility with the legacy Internet, the AP has to forward the individual messages of A and B to their respective destinations. As far as the communication within the WLAN is concerned, it is a non-relay setting in which the AP serves as the termination point for the messages from A and B, because AP is used to derive these individual messages explicitly rather than their network-coded message. Hence, there is no relaying between nodes A and B within the WLAN.

Nevertheless, according to some embodiments, packet A⊕B may still be useful in this non-relay setting by devising a two-layer decoding approach amenable to real-time implementation. Specifically, two components are used: (1) PHY-layer channel decoders, and (2) MAC-layer erasure channel decoders. For component (1), a MUD channel decoder is first used to try and decode both packets A and B. If the MUD decoder successfully decodes both packets, then no further processing may be necessary. However, in some scenarios, only packet A or packet B can be obtained, or neither of them can be obtained. In the event that the MUD decoder can decode only one of packet A or B, or none of them, a PNC channel decoder is then used to try to decode A⊕B (A XOR B). The likelihood of the PNC decoder to be able to decode A⊕B when the MUD decoder does not have complete success in decoding packets A and B can be substantial. For example, at SNR of 8.5 dB, there can be a probability of 22% that the MUD decoder can decode only one of packet A or B. When only one of the packets can be decoded by the MUD decode, there can be a probability of 85% that A⊕B can be decoded with the PNC decoder. For example, A⊕B can be used along with the available native decoded packet to recover the missing native packet. This technique is referred to herein as the PHY-layer bridging effect of network-coded packets in which a native packet can be used with a complementary network-coded packet to recover a missing native packet. This is an example of how the network-coded packet can be useful according to some embodiments.

Component (2) provides a further example of how network-coded packets can be useful according to some embodiments. In some scenarios, at SNR of 8.5 dB, the MUD decoder may fail to decode both packets A and B with a probability of 55%. When neither A nor B can be decoded by the MUD decoder, the PNC decoder may still decode A⊕B with a probability of 40%. At first glance, the lone A⊕B may not seem useful because the lone A⊕B cannot be used together with an available native packet to recover a missing native packet. Nevertheless, utility can still be extracted out of such lone network-coded packets according to some embodiments. Although there is no mutual information between the network-coded packet and either of the two native packets when neither of the native packets is available, component (2) provides a way to use lone network-coded packets by exploiting mutual information at the message level. At the MAC layer of NCMA, block messages $M^A$ and $M^B$ from A and B are coded using an erasure channel code (e.g., the Reed Solomon code) and partitioned into smaller constituent packets. The block messages $M^A$ and $M^B$ could be jumbograms from IPv6 or other large messages from the network layer (e.g., those from big data communication).

Provided enough of the constituent packets of A (or B) can be obtained at the PHY layer, then $M^A$ (or $M^B$) can be obtained at the MAC layer with erasure channel coding. In such a scenario, lone packets from the PHY layer can be useful, for example, as follows. Suppose that at some point in time, the PHY layer has decoded enough packets of A for it to obtain $M^A$. Having the source message $M^A$ then allows the AP to derive all the missing packets A in the previous transmissions. This includes the time slots in which the PHY-layer decoders could not decode both packets A and B but could decode packet A⊕B. With the newly derived packets A, their corresponding missing packets B can now be recovered through the previously lone A⊕B. Hence, it can be seen that once one of $M^A$ or $M^B$ can be decoded, the lone A⊕B packets can be used to derive the native packets even when there is one or more time slots in which the MUD decoder fails to decode both packets A and B. This technique is referred to herein as the MAC-layer bridging effect of network-coded packets.

Thus, embodiments of the techniques described herein provide at least the following:
1. Utilization of PNC in a non-relay setting;
2. (a) a MUD decoder and a PNC decoder for convolutional codes that are amenable to real-time implementation; (b) PHY-layer and MAC-layer bridging algorithms that exploit native and network-coded packets decoded by the MUD and PNC decoders (with throughput approaching the theoretical achievable upper bound at SNR≥9 dB); and (c) an NCMA MAC protocol that can realize the potential throughput gain of the decoding algorithms described herein.
3. As demonstrated with a NCMA system implemented, for example, in a USRP platform: (a) 100% throughput gain at the medium-high SNR regime (≥10 dB) compared with the user-by-user transmission system in the NCMA system; and (b) robustness of the NCMA system when the receive powers from different users are imbalanced in an indoor environment.

2. Overview

This section gives a quick overview of the architecture of the NCMA system and the results that motivates its design according to some embodiments.

2.1 NCMA Architecture

Figure 2:
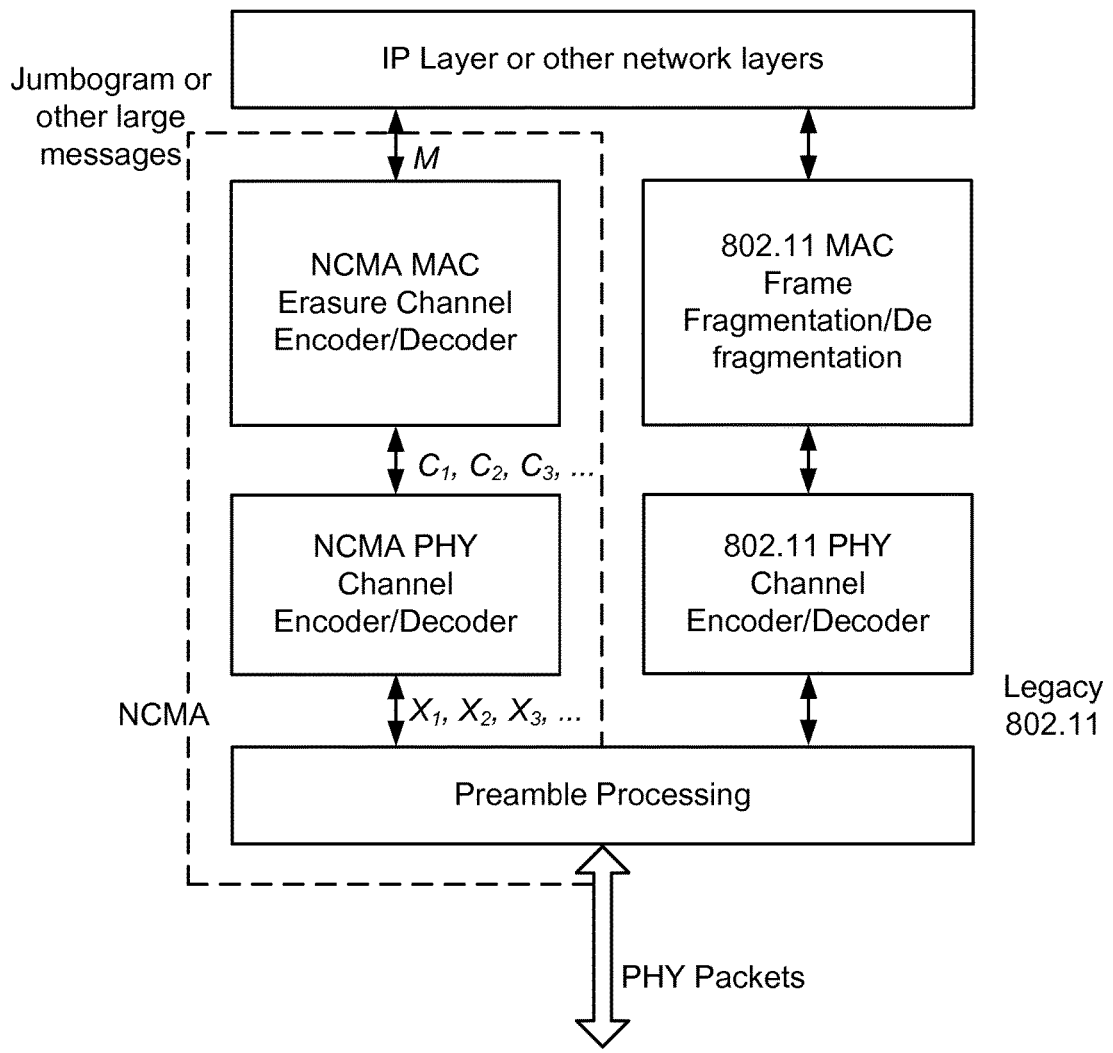
FIG. 2 depicts the architecture of a Network-Coded Multiple Access (NCMA) node according to some embodiments.

FIG. 2 shows the architecture of a node equipped with NCMA capability in some embodiments. For legacy compatibility, the node can revert to 802.11 when necessary. The NCMA packets may use different preambles than 802.11 so that the receiver can distinguish between NCMA packets and 802.11 packets.

NCMA can support IPv6 jumbograms or other large messages from the network layer. Instead of chopping a large message M from the network layer into independent packets, it makes use of an erasure channel code to encode the message into multiple packets, $C_1, C_2, \ldots$. The erasure channel code adopted can be a Reed Solomon ("RS") code or a rateless channel code. Provided a sufficient number of these packets are received correctly, then the original source message can be decoded at the receiver. At the PHY layer, each packet $C_i$ is further channel-coded into a packet $X_i$. For the USRP implementation, the RS code is used at the MAC layer, and the convolutional code is used in 802.11 at the PHY layer.

In the NCMA mode, the node transmits packets $X_1, X_2, \ldots$ in different time slots, and a packet may not be retransmitted even if it may not be received successfully. Also, there is no acknowledgement from the receiver until it has successfully decoded the associated message M.

2.2 PHY Layer Decoding and Bridging

In some embodiments, a single-user soft input Viterbi decoding algorithm ("VA") is used in the NCMA. Adaptations may be necessary because the NCMA is a multiuser system rather that a single-user system. The details on adapting the single-user VA for PNC and MUD decoding can be found in Section 4. It should be noted that this adaptation approach aims for reduced complexity rather than optimality in the PNC and MUD decoder designs. In some embodiments, more optimal decoders can be used. Nevertheless, the single-user VA decoder does allow efficient real-time decoding without employing overly complicated decoders (see Section 4).

According to some embodiments, two multiuser PHY-layer channel decoders include: a MUD decoder and a PNC decoder. When two nodes A and B transmit to the AP simultaneously, the MUD decoder attempts to decode both $C_i^A$ and $C_i^B$ based on the overlapped signals of $X_i^A$ and $X_i^B$; the PNC decoder, on the other hand, attempts to decode $C_i^A \oplus C_i^B$ (the bit-wise XOR of $C_i^A$ and $C_i^B$) based on the same overlapped signals.

Eight Possible Decoding Outcomes—

For the MUD decoder, there are four possible outcomes: (i) both $C_i^A$ and $C_i^B$ are successfully decoded; (ii) only $C_i^A$ is successfully decoded; (iii) only $C_i^B$ is successfully decoded; or (iv) both $C_i^A$ and $C_i^B$ cannot be decoded. For the PNC decoder, there are two possible outcomes: (I) $C_i^A \oplus C_i^B$ is successfully decoded; or (II) $C_i^A \oplus C_i^B$ cannot be decoded. As a result, there are 4×2=8 possible combined outcomes. FIG. 3 shows a contrived example in which the eight possible combined outcomes (events) occur in successive time slots.

2.2.1 Leveraging Complementary XOR Packets

In FIG. 3, empty entries (ϕ) mean the corresponding packets cannot be decoded. Each column is labeled $Eq^J$ corresponding to packet type J being decoded. Each column forms a linear equation system for MAC-layer decoding.

Figure 10:
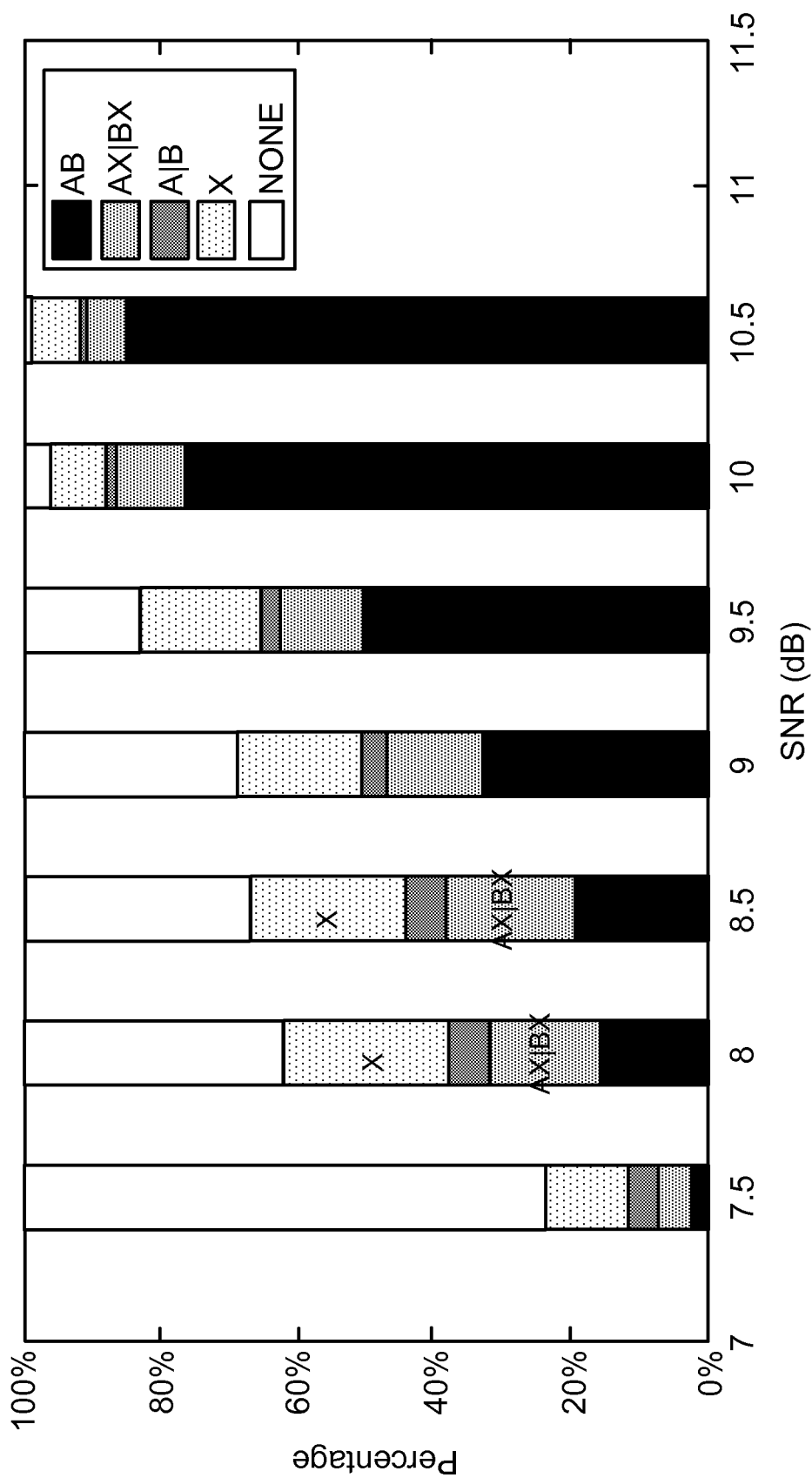
FIG. 10 depicts an example of NCMA physical-layer packet decoding statistics versus signal-to-noise ratio ("SNR") with two nodes having the same SNR according to some embodiments.

In FIG. 3, event (ii)(I) and event (iii)(I) occur in timeslots 3 and 4, in which $C_3^A$ and $C_3^A \oplus C_3^B$ (abbreviated as $C_3^{A \oplus B}$), and $C_4^A \oplus C_4^B$ (abbreviated as $C_4^{A \oplus B}$), are decoded, respectively. In these two cases, the complementary XOR packets, $C_3^A \oplus C_3^B$ and $C_4^A \oplus C_4^B$, can be used to recover the missing native packets, $C_3^B$ and $C_4^A$, respectively. That is, these two events are equivalent to event (i) in which both native packets can be decoded. Referring to FIG. 10 (the details of which will be discussed in Section 5), at SNR=8.5 dB, the probabilities of events (ii)(I) and (iii)(I), annotated as AX|BX in the figure, may not be negligible. Specifically, they occur about 20% of the time. Thus, this means the complementary XOR packets can be used to recover the missing native packets around 20% of the time.

2.3 MAC-Layer Decoding and Bridging

Returning to FIG. 3, event (iv)(I) occurs in time slot 7. None of the native packets can be decoded by the MUD decoder; on the other hand, the PNC decoder can decode $C_7^A \oplus C_7^B$. Such lone $C_i^A \oplus C_i^B$ are not useful as far as the recovery of the native packets is concerned. Yet, event (iv)(I) may not be negligible. As shown in FIG. 10, the event of lone XOR packet, annotated as X in the figure, occurs around 20% of the time at SNR=8.5 dB. This suggests that the system performance can be improved if the lone XOR packet can be leveraged. Lone $C_i^A \oplus C_i^B$ turns out to be useful for MAC-layer decoding, where the correlations and mutual information among successive packets can be leveraged. FIG. 4 illustrates this concept.

2.3.1 Leveraging Lone XOR Packets

In the upper left table of FIG. 4, it is assumed that the AP has recovered enough PHY packets $C_i^A$ of different i for it to decode $M^A$—in this simplified example, L=3 PHY packets are needed. Once $M^A$ is decoded, all the $C_i^A$ that could not be obtained by the PHY-layer decoders can now be recovered (through re-encoding based on $M^A$). In FIG. 4, these are the $C_2^A$ and $C_3^A$ circled in the dotted line as shown in the upper right table. Note that once $C_2^A$ is recovered, the previously lone $C_2^A \oplus C_2^B$ is converted into a complementary XOR packet and can be used to recover $C_2^B$, shown in the solid line circle in the lower left table. In this example, there are enough $C_i^B$ of different i to decode $M^B$. The details and effectiveness of such MAC-layer bridging by XOR packets will be addressed in Section 3 and Section 5, respectively.

2.4 NCMA MAC Protocol

To leverage the aforementioned decoding and bridging mechanisms, a MAC protocol that promotes concurrent transmissions by multiple nodes to the AP may be used. An example that covers the essence of NCMA according to some embodiments is described below.

Figure 5:
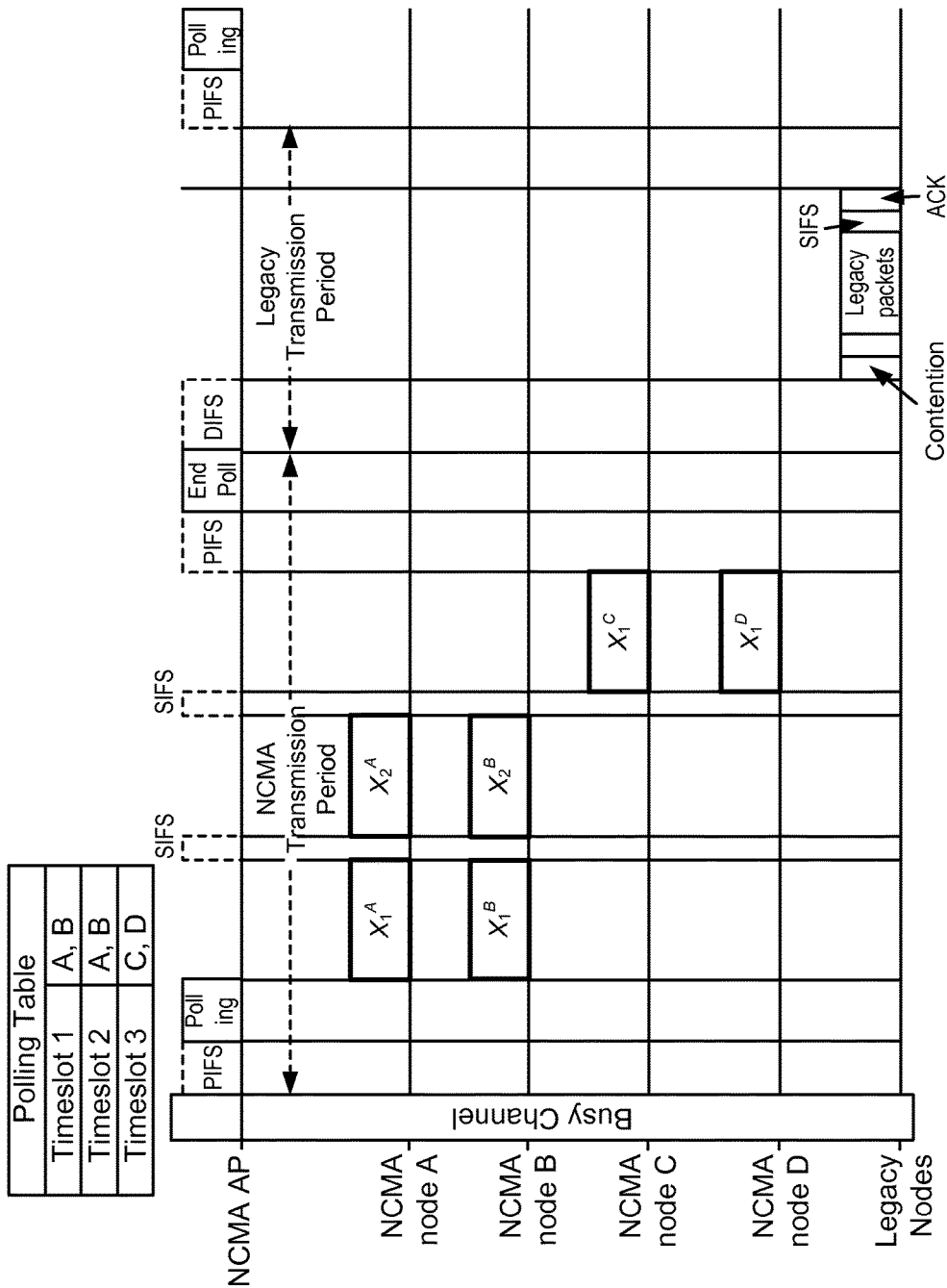
FIG. 5 depicts NCMA uplink media access with NCMA and legacy nodes according to some embodiments.

FIG. 5 illustrates the uplink operation of this protocol. The polling table is contained in the Polling frame, and the End Poll frame terminates the NCMA channel access session. Here, there are four NCMA nodes: A, B, C, and D. Their source messages have been encoded into PHY-layer packets: $X_1^A, X_2^A, \ldots; X_1^B, X_2^B, \ldots, X_1^C, X_2^C, \ldots; X_1^D, X_2^D, \ldots$. As far as the scheduling of the transmissions is concerned, the NCMA operation is similar to, but not exactly the same as, the 802.11 point coordination function ("PCF"). As in 802.11 PCF, a transmission round is divided into two periods: contention-free period ("CFP") and contention period. NCMA nodes transmit during CFP, and legacy 802.11 nodes transmit during the contention period using 802.11 DCF.

The AP coordinates the NCMA transmissions during CFP by polling. Each poll coordinates the transmissions in a number of successive transmission timeslots. A difference compared with the PCF in 802.11 is that a number of nodes may transmit together in a time slot here. In other words, instead of avoiding collisions as in the original PCF, here the AP actually tries to encourage "collisions". As illustrated in FIG. 5, nodes A and B transmit together in time slots 1 and 2, and nodes C and D transmit together in time slot 3.

Another difference with 802.11 PCF is that the AP does not issue an ACK immediately upon the reception of each packet. Rather, an ACK will be issued when the whole MAC-layer source message M of a source has been decoded.

3. MAC-Layer Message Decoding Algorithm

This section describes the details of NCMA MAC-layer decoding.

3.1 Preliminary: Single-User Erasure Channel Coding and Decoding

A single-user case in which only node A transmits will first be described. For ease of explanation, the use of the RS erasure channel code will be described. However, it should be understood that extensions to other erasure codes, including advanced rateless codes, are possible. The symbols of source message $M^A$ of node A can be organized in matrix form as follows:

$$M^A = [M_1^A \ldots M_j^A \ldots M_K^A] \quad (1)$$

$$= \begin{bmatrix} a_{1,1} & \cdots & a_{1,j} & \cdots & a_{1,K} \\ \vdots & \ddots & \vdots & \ddots & \vdots \\ a_{i,1} & \cdots & a_{i,j} & \cdots & a_{i,K} \\ \vdots & \ddots & \vdots & \ddots & \vdots \\ a_{L,1} & \cdots & a_{L,j} & \cdots & a_{L,K} \end{bmatrix},$$

where $\alpha_{i,j} \in GF(2^s)$. For example, if s=8, each symbol $\alpha_{i,j}$ is a byte and there are altogether KL bytes in the source message. The generator matrix for the RS code is:

$$G = \begin{bmatrix} G_1 \\ \vdots \\ G_i \\ \vdots \\ G_N \end{bmatrix} = \begin{bmatrix} g_{1,1} & g_{1,2} & \cdots & g_{1,L} \\ \vdots & \vdots & \ddots & \vdots \\ g_{i,1} & g_{i,2} & \cdots & g_{i,L} \\ \vdots & \vdots & \ddots & \vdots \\ g_{N,1} & g_{N,2} & \cdots & g_{N,L} \end{bmatrix}, \quad (2)$$

where $g_{i,j} \in GF(2^s)$. There are altogether $N=2^s-1$ nonzero elements in $GF(2^s)$. Nonzero elements are denoted by $\alpha_1, \alpha_2, \ldots, \alpha_N$ and set $$G_i = [1 \ \alpha_i \ \alpha_i^2 \ \ldots \ \alpha_i^{L-1}], \ 1 \le i \le N.$$

Any L of the vectors $G_1, G_2, \ldots, G_{N-1}$ are linearly independent. This linearly independent property will be referred to herein as "Property 1." For each message $M^A$, N coded packets can be generated, for each of K symbols, by:

$$C^A = \begin{bmatrix} C_1^A \\ \vdots \\ C_i^A \\ \vdots \\ C_N^A \end{bmatrix} = GM^A. \quad (3)$$

In the above, a packet $C_i^A$ is represented as a 1×K row vector. A packet $C_i^A$ will not be retransmitted if it cannot be received; the transmission process just progresses to the next packet $C_{i+1}^A$. The receiver only needs to receive any L of the N packets in the set $\{C_1^A, \ldots, C_i^A, \ldots, C_N^A\}$ to decode $M^A$. Upon receiving any L packets, denoted by $C_{(1)}^A, C_{(2)}^A, \ldots, C_{(L)}^A$, the AP can decode message $M^A$ as follows:

$$\tilde{C}^A = \begin{bmatrix} C_{(1)}^A \\ \vdots \\ C_{(i)}^A \\ \vdots \\ C_{(L)}^A \end{bmatrix} = \tilde{G}M^A = \begin{bmatrix} G_{(1)} \\ \vdots \\ G_{(i)} \\ \vdots \\ G_{(L)} \end{bmatrix} [M_1^A \ \ldots \ M_i^A \ \ldots \ M_K^A]. \quad (4)$$

By Property 1, $\tilde{G}$ is invertible. Thus, message A can be extracted by the following expression:

$$M^A = \tilde{G}^{-1}\tilde{C}^A. \quad (5)$$

With s=8, there are N=255 coded packets. Recall that in NCMA, there may be no PHY-layer ACK, and the same packet $C_i^A$ may not be retransmitted even if may not be received correctly at the AP. Thus, there is a chance that the transmitter runs out of packets $C_i^A$ to transmit after all 255 of them have been transmitted, and still the AP cannot decode $M^A$. However, as described in Section 5, in some embodiments, an L of no more than 32 can be used, and the transmitter does not run out of packets to transmit before the message is decoded.

3.2 NCMA Erasure Channel Coding and De-Coding

A NCMA scenario in which node A and node B transmit their i-th packets, $C_i^A$ and $C_i^B$, simultaneously for i=1, 2, ... until at least one of the two messages, $M^A$ or $M^B$, is decoded will now be described. For optimal decoding according to some embodiments, three interacting equation systems are used: the first, denoted by $Eq^A$, is for decoding $M^A$; the second, denoted by $Eq^B$, is for decoding $M^B$; and the third, denoted by $Eq^{A \oplus B}$, is for decoding $M^A \oplus M^B$.

3.2.1 Equation System $Eq^A$

Recall that there are eight possible outcomes (events) (see Section 2.2 and FIG. 3) for PHY-layer decoding, corresponding to the decoding outcomes of the MUD decoder and PNC decoder for transmission i. For events, (i), (ii), and (iii)(I), $C_i^A$ can be obtained. For events (i) and (ii) (whether the PNC decoding is successful or not), $C_i^A$ is directly given by the MUD decoder. For event (iii)(I), $C_i^A$ is obtained by $C_i^A = C_i^B \oplus C_i^{A \oplus B}$. Any of the events (i), (ii), or (iii)(I), yields a packet of type $C_i^A$. As nodes A and B transmit their successive packets, as soon as L packets of type $C_i^A$ are received, message $M^A$ can be decoded.

3.2.2 Equation System $Eq^B$

Similar to $Eq^A$ above—as soon as L packets of type $C_i^B$ are received, $M^B$ can be decoded.

3.2.3 Equation System $Eq^{A \oplus B}$

Here, event (i) and event (I) are of interest, since in both these events, $C_i^{A \oplus B}$ can be obtained. As for $Eq^A$, as soon as L packets of type $C_i^{A \oplus B}$ are received, $M^A \oplus M^B$ can be decoded using the same strategy. In particular, because of the linearity of the RS code, the decoding is similar to (5).

3.2.4 Interactions of $Eq^A$, $Eq^B$, and $Eq^{A \oplus B}$

In Section 2.3, the example of FIG. 4 was described. Here, this example will be explained from the perspective of the interactions between the three equation systems. At the end of time slot 5, the situation is depicted in the upper left table in FIG. 4. The status of the three equation systems is:

$$Eq^A: \tilde{C}^A = \begin{bmatrix} C_1^A \\ C_4^A \\ C_5^A \end{bmatrix} = \begin{bmatrix} G_1 \\ G_4 \\ G_5 \end{bmatrix} M^A$$

$$Eq^B: \tilde{C}^B = \begin{bmatrix} C_3^B \\ C_4^B \end{bmatrix} = \begin{bmatrix} G_3 \\ G_4 \end{bmatrix} M^B$$

$$Eq^{A \oplus B}: \tilde{C}^{A \oplus B} = \begin{bmatrix} C_2^{A \oplus B} \\ C_4^{A \oplus B} \end{bmatrix} = \begin{bmatrix} G_2 \\ G_4 \end{bmatrix} (M^A \oplus M^B)$$

In this example, L=3. According to Property 1, [G1 G4 G5] is a full-rank matrix. Therefore, it can be inverted to solve for $M^A$ in $Eq^A$. Once, $M^A$ is obtained, the two missing packets can be solved: $C_2^A = G_2 M^A$; $C_3^A = G_3 M^A$. This is illustrated in the upper right table in FIG. 4.

It is further noted that with $C_2^A$ and $C_2^{A \oplus B}$, $C_2^B = C_2^A \oplus C_2^{A \oplus B}$ can be obtained, which is illustrated in the lower left table. With L=3 equations for $Eq^B$, $M^B$ can be obtained.

The XOR equations $Eq^{A \oplus B}$ serve as a bridge between $Eq^A$ and $Eq^B$ at the MAC layer. This bridge can increase the number of available equations in $Eq^A$ and $Eq^B$. When one of the two equation systems, $Eq^A$ or $Eq^B$, has L equations, then additional equations in the other equation system can also be obtained through the bridge.

It is also possible that $Eq^{A \oplus B}$ has L equations before $Eq^A$ or $Eq^B$ does. In this case, the availability of $M^A \oplus M^B$ gives all the packets $C_i^{A \oplus B}$, i=1, ..., N, which can then serve as the bridge to obtain $C_i^A$ and $C_i^B$ that were previously unavailable. In particular, once $Eq^{A \oplus B}$ is solved, the number of available equations in $Eq^A$ and $Eq^B$ will be the same from then on, because knowing $C_i^A$ means knowing $C_i^B$, and vice versa. Thus, once $Eq^{A \oplus B}$ is solved, either both $Eq^A$ and $Eq^B$ are solved at the same time as $Eq^{A \oplus B}$ (when the bridge causes them both to have L or more equations), or both $Eq^A$ and $Eq^B$ need the same number of additional equations for solution (when they still have fewer than L equations). For the latter, the subsequent transmissions will be more efficient because each time when only $C_i^A$ or $C_i^B$ is decoded at the PHY layer, the missing packet can be derived through the bridge.

3.2.5 Intermixing Message Pairs

In the example of FIG. 4, enough equations are created through the bridge that message $M^B$ can also be solved at the same time as message $M^A$. In general, it is possible that $Eq^B$ still may not have enough equations. Then $M^B$ of node B can be paired with the next message of node A, or be paired with a message from a different node, say node C. This seamless pairing can ensure that the available equations in $Eq^B$ are not wasted. The new message may start off with needing L equations while $M^B$ needs fewer equations for eventual solution. Note that the packets associated with the new message, e.g., $M^C$, can be sent in the sequence of $C_{j+1}^C$, $C_{j+2}^C$, ..., $C_1^C$, $C_2^C$, ..., if $C_j^B$ was the last packet sent by node B. This is so as to align the equations of node B and node C in the three equation systems.

4. PHY Layer Channel Decoding

The preceding section focused on MAC-layer decoding. At the PHY layer, channel coding is applied to $C_i^A$ and $C_i^B$ by node A and node B to form $X_i^A$ and $X_i^B$ for transmission. At the AP, the PHY decoders attempt to obtain $C_i^A$, $C_i^B$, and $C_i^{A \oplus B}$ from the overlapped $X_i^A$ and $X_i^B$. At the PHY layer, NCMA can adopt the same convolutional code as in 802.11. The PHY decoder design can be simplified so that real-time decoding is possible in the USRP implementation. The single-user VA decoder is used in real communication system because of its low complexity. As such, a soft-input Viterbi decoding algorithm ("VA") for PNC and MUD decoding can be adapted accordingly. It should be understood that more optimal decoders with better decoding performance may be possible for PNC and MUD; however, they may be more complex and may not amenable to real-time decoding. It should be noted that single-user VA is meant for a single user system. NCMA, by contrast, is intrinsically a multiuser system, and the PNC and MUD decoders have to process overlapped signals from multiple users. Hence, single-user VA cannot be used as is. This section describes adaptation of the single-user VA for PNC and MUD decoding.

4.1 Preliminary: Single-User ("SU") Viterbi Algorithm

The use of VA when applied to the single-user system will first be described, for example, with reference to an OFDM system. Let X denote the packet transmitted and x[k] denote the value of bit k within the packet X. Let y[k] be the received signal corresponding to bit k given by:

$$y[k] = h_{sig} x[k] + n[k], \quad (6)$$

where $x[k]=1$ if bit k is 0 and $x[k]=-1$ if bit k is 1; and $n[k]$ is the zero mean Gaussian noise with variance $\sigma^2$.

In the above, note that instead of writing h for the channel gain, $hs_k$, where $s_k$ is the subcarrier on which bit k is transmitted, and $hs_k$ is the channel gain associated with that subcarrier. VA can be used to provide a confidence metric for each bit, $\tilde{x}[k]$, to the Viterbi shortest-path algorithm. This confidence metric is also referred to as the soft bit, and is computed by the $\log(P_0[k]/P_1[k])$, where $P_0[k]=P(x[k]=1|y[k])$ and $P_1[k]=P(x[k]=-1|y[k])$. Thus, $\tilde{x}[k]$ takes on a real value. The more positive it is, the more confident that bit k is 0; and the more negative it is, the more confident that bit k is 1. The VA then finds the maximum likelihood ("ML") codeword $X=\{x[k]\}_{k=1, 2, \ldots}$ with the minimum:

$$-\sum_k \tilde{x}[k]x[k]$$

or maximum:

$$\sum_k \tilde{x}[k]x[k]$$

A shortest-path algorithm is applied on the trellis associated with the convolutional code.

4.2 Soft Decoders for NCMA

Figure 6:
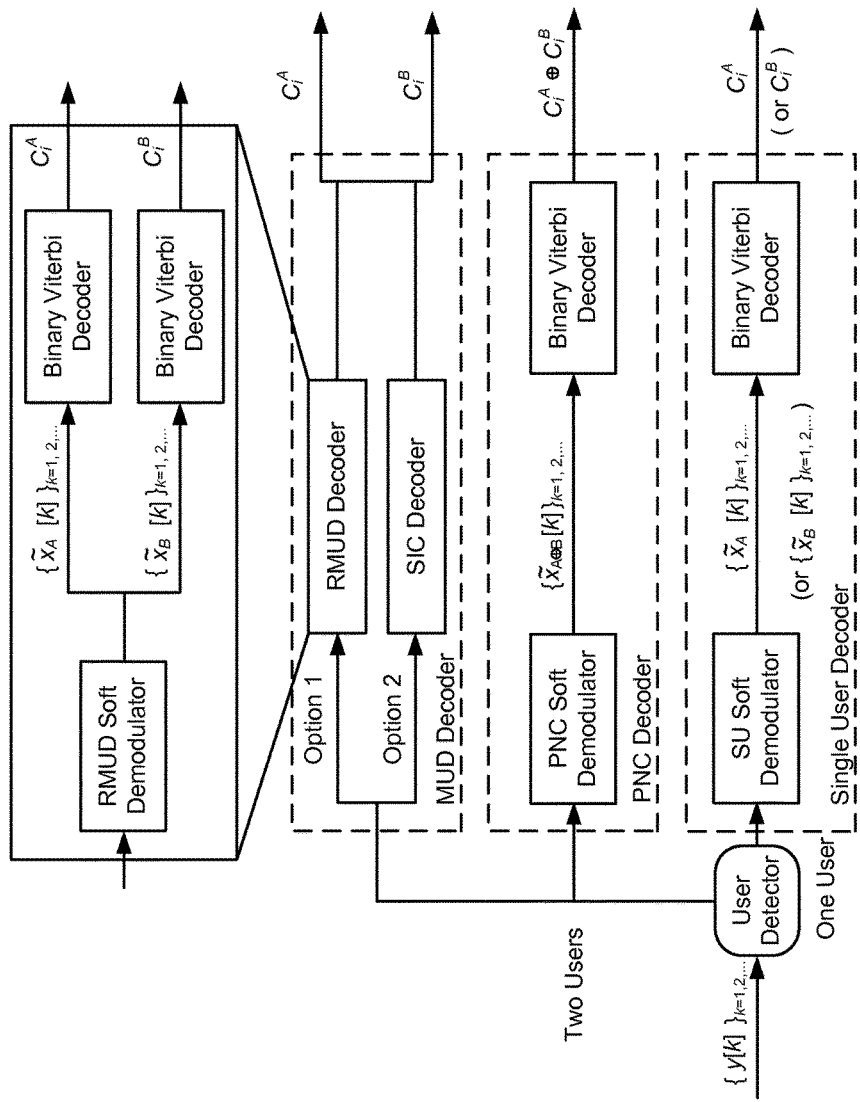
FIG. 6 depicts a single-user decoder, a MUD decoder, and a PNC decoder design for overall PHY-layer channel decoding in NCMA according to some embodiments.

The block diagram of the overall NCMA channel decoder, according to some embodiments, is shown in FIG. 6. In this figure, the index k is over multiple symbols in a frame. Given the input $\{y[k]\}_{k=1, 2, \ldots}$, the AP first detects the presence of signals from the users (using correlation on the preambles). If only one user transmits and only the signal from that user is detected, then a single-user VA is used (the lowest branch in the block diagram). If there are overlapping signals from two users, then both the MUD decoder and the PNC decoder are used (the upper two branches in the block diagram). Each of the decoders may use the binary Viterbi algorithm for decoding. The single-user decoder, PNC decoder, and MUD decoder may differ in the ways their demodulators compute the soft information to be fed to the binary Viterbi decoder. In the next two subsections, computation of the soft information in the PNC demodulator and the MUD demodulator will be described.

4.2.1 PNC Decoder

To allow the usage of the binary VA, the number of constellation points can be reduced to two for ease of explanation. These two constellation points correspond to the most probable points for the two different XOR values. The log likelihood ratio based on these two constellation points is used as the soft-information to be fed to the binary VA. In FIG. 6, the PNC demodulator is responsible for computing this soft information. This strategy may be referred to as reduced-constellation decoding. Let $X^A=(x_A[1], \ldots x_A[k], \ldots)$ and $X^B=(x_B[1], \ldots, x_B[k], \ldots)$ denote the PHY-layer codewords (transmitted packets) of users A and B, and let $\Pi(\bullet)$ denote functional mapping corresponding to convolutional coding. Since $\Pi(\bullet)$ is linear, $X^A \oplus X^B = \Pi(C^A) \oplus \Pi(C^B) = \Pi(C^A \oplus C^B)$. This means that the XOR of individual bits $\{x_A[k] \oplus x_B[k]\}_{k=1, 2, \ldots}$ can be detected first, and then feed the information on these XOR bits to the convolutional decoder for decoding. For the PNC decoder, the PNC demodulator can feed soft information on $\{x_A[k] \oplus x_B[k]\}_{k=1, 2, \ldots}$ to the VA. For the subsequent discussion, for brevity, the index k will be dropped in the notations. In addition, $x_A[k] \oplus x_B[k]$ will simply be denoted as $X_{A \oplus B}$.

The soft bit for $x_{A \oplus B}$, denoted as $\tilde{x}_{A \oplus B}$, follows the same reasoning as for $\tilde{x}$ of the single-user VA. Recall from the discussion in Section 4.1 that in the single-user VA, $\tilde{x}=\log(P_0/P_1)$ is the log likelihood ratio, where $P_0$ is the probability that the bit is 0 and $P_1$ is the probability that the bit is 1. When there are signals from both nodes A and B, in place of (6), the received signal is:

$$y = h_A x_A + h_B x_B + n, \quad (7)$$

where $h_A$ and $h_B$ are channel gains of the received packets from nodes A and B respectively, and n is Gaussian noise with variance $\sigma^2$. For $\tilde{x}_{A \oplus B}$, the log likelihood ratio is given by:

$$\log \frac{P_0}{P_1} = \log \frac{Pr\{x_A=1, x_B=1 \mid y\} + Pr\{x_A=-1, x_B=-1 \mid y\}}{Pr\{x_A=-1, x_B=1 \mid y\} + Pr\{x_A=1, x_B=-1 \mid y\}} \quad (8)$$

$$= \log\left(\exp\left\{-\frac{|y-h_A-h_B|^2}{2\sigma^2}\right\} + \exp\left\{-\frac{|y+h_A+h_B|^2}{2\sigma^2}\right\}\right) -$$

$$\log\left(\exp\left\{-\frac{|y+h_A-h_B|^2}{2\sigma^2}\right\} + \exp\left\{-\frac{|y-h_A+h_B|^2}{2\sigma^2}\right\}\right).$$

Unlike the single-user case, it may be difficult to further simplify the log likelihood ratio expression above without approximation. Adopting the log-max approximation:

$$\log\left(\sum_i \exp(z_i)\right) \approx \max_i z_i \quad (9)$$

gives:

$$\frac{\sigma^2}{2} \log \frac{P_0}{P_1} \approx \frac{1}{4}\max\{-|y-h_A-h_B|^2, -|y+h_A+h_B|^2\} -$$

$$\frac{1}{4}\max\{-|y+h_A-h_B|^2, -|y-h_A+h_B|^2\}.$$

Let $\tilde{x}_{A \oplus B} = \sigma^2/2 \log(P_0/P_1)$ given in (9) since the constant factor $\sigma^2$ may not affect the shortest path found by VA.

Figure 7A:
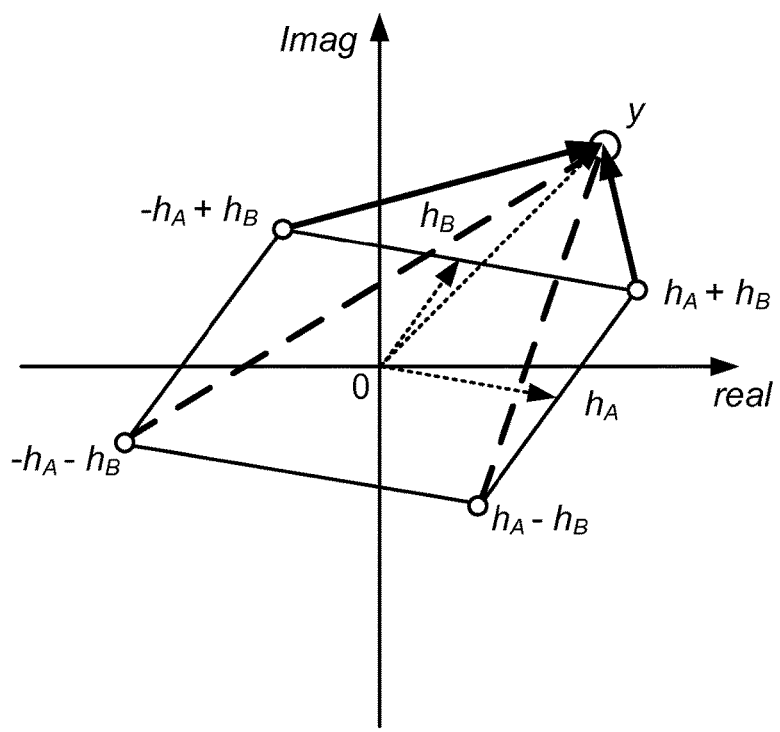
FIGS. 7A-B depict a PNC soft demodulation which gives soft information on XOR bit according to some embodiments.
Figure 7B:
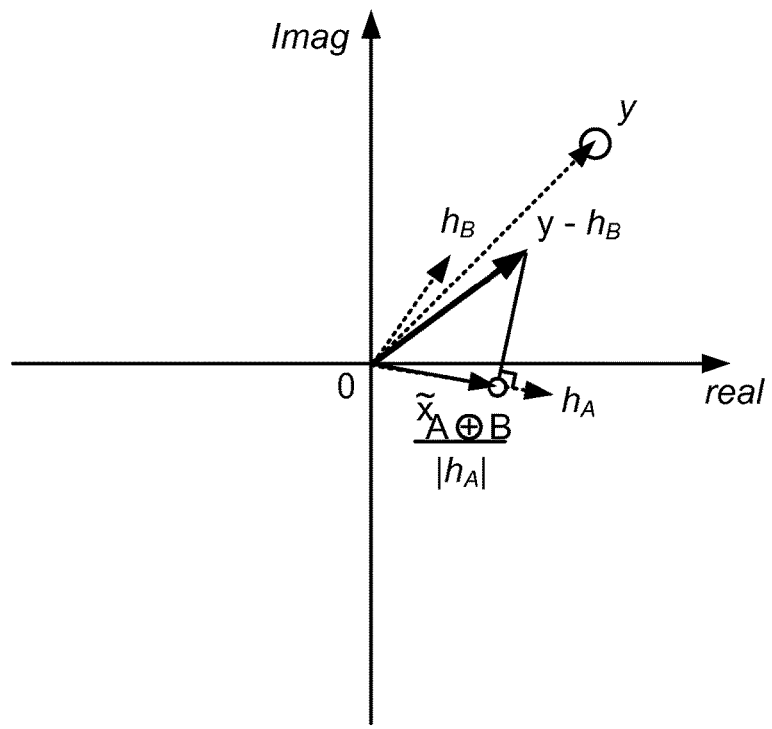

Equation (9) can be further simplified. This is illustrated with the example in FIG. 7, which shows the constellation map of a specific pair of channel gains, $h_A$ and $h_B$. The solid and dashed lines represent the Euclidean distances between the received sample and the two possible transmitted constellation points that are mapped to the same XOR value. The solid lines shown in FIG. 7A are selected to represent the Euclidean distances to the two different values of the XOR bit $x_{AB}$. The projection of $y-h_B$ onto $h_A$ to get the soft information $\tilde{x}_{AB}$ is shown in FIG. 7B.

With Binary Phase-Shift Keying ("BPSK") modulation, $(x_A, x_B)$ takes on four possible values, $(\pm 1, \pm 1)$. In (9), either $(+1,+1)$ or $(-1,-1)$ can be chosen in the first $\max(\bullet)$ function, and either $(+1,-1)$ or $(-1,+1)$ can be chosen in the second $\max(\bullet)$ function. Which pair is chosen depends on y. FIG. 7 illustrates a particular realization of y such that $(+1,+1)$ and $(-1,+1)$ is chosen. The corresponding soft bit for $X_{A \oplus B}$ is:

$$\tilde{x}_{A \oplus B} = -\frac{1}{4}|y-h_A-h_B|^2 + \frac{1}{4}|y+h_A-h_B|^2 \quad (10)$$

$$= h_A \cdot (y - h_B).$$

The fact that (+1,+1) and (−1,+1) are chosen implicitly means that a first decision is made that node B transmits 1. Thus, the XOR value based on what node A transmits can then be decided. The term $y-h_B$ in (10) corresponds to subtracting from the received sample y the decision that node B transmits 1. The component that contains the signal from node A can therefore be defined as $y_A=y-h_B$. It can be shown that the dot product $h_A \cdot y_A$ is simply the soft information for an equivalent single user case in which only node A transmits. For other realizations of y, $\tilde{x}_{A \oplus B}$ can be found similarly. Specifically, there are four cases. If y is such that:

(+1,+1) and (−1,+1) are chosen, then $\tilde{x}_{A \oplus B} \approx h_A \cdot (y-h_B)$;
(−1,−1) and (−1,+1) are chosen, then $\tilde{x}_{A \oplus B} \approx -h_B \cdot (y+h_A)$;
(+1,+1) and (+1,−1) are chosen, then $\tilde{x}_{A \oplus B} \approx h_B \cdot (y-h_A)$;
(−1,−1) and (+1,−1) are chosen, then $\tilde{x}_{A \oplus B} \approx -h_A \cdot (y+h_B)$.

Feeding $\{\tilde{x}_{A \oplus B}[k]\}_{k=1, 2, ...}$ to the standard VA allows us to decode for $C^A \oplus C^B$.

4.2.2 MUD Decoders

Two possible MUD decoders, according to some embodiments, are shown in the upper portion of FIG. 6. The first MUD decoder may be similar to the PNC decoder in that it is based on the principle of reduced constellation. This MUD decoder is referred to as the reduced-constellation MUD ("RMUD") decoder. The second MUD decoder is based on the successive interference cancellation ("SIC") principle. The details of these two MUD decoders are described below.

RMUD: The RMUD soft demodulator (see FIG. 6) provides the soft information on $x_A$ and $x_{13}$, $\tilde{x}_A$ and $\tilde{x}_B$, to two separate standard VA decoders, one for decoding $C_i^A$ and one for decoding $C_i^B$. As an example, for $\tilde{x}_B$, the associated log likelihood function is:

$$\log \frac{P_0}{P_1} = \log\left(\exp\left\{-\frac{|y-h_A-h_B|^2}{2\sigma^2}\right\} + \exp\left\{-\frac{|y+h_A-h_B|^2}{2\sigma^2}\right\}\right) - \log\left(\exp\left\{-\frac{|y-h_A+h_B|^2}{2\sigma^2}\right\} + \exp\left\{-\frac{|y+h_A+h_B|^2}{2\sigma^2}\right\}\right). \quad (11)$$

For the same example as in FIG. 7, equation (11) can be simplified to the following using the same strategy as in the preceding section:

$$\tilde{x}_B \approx h_B \cdot (y-h_A). \quad (12)$$

Figure 8A:
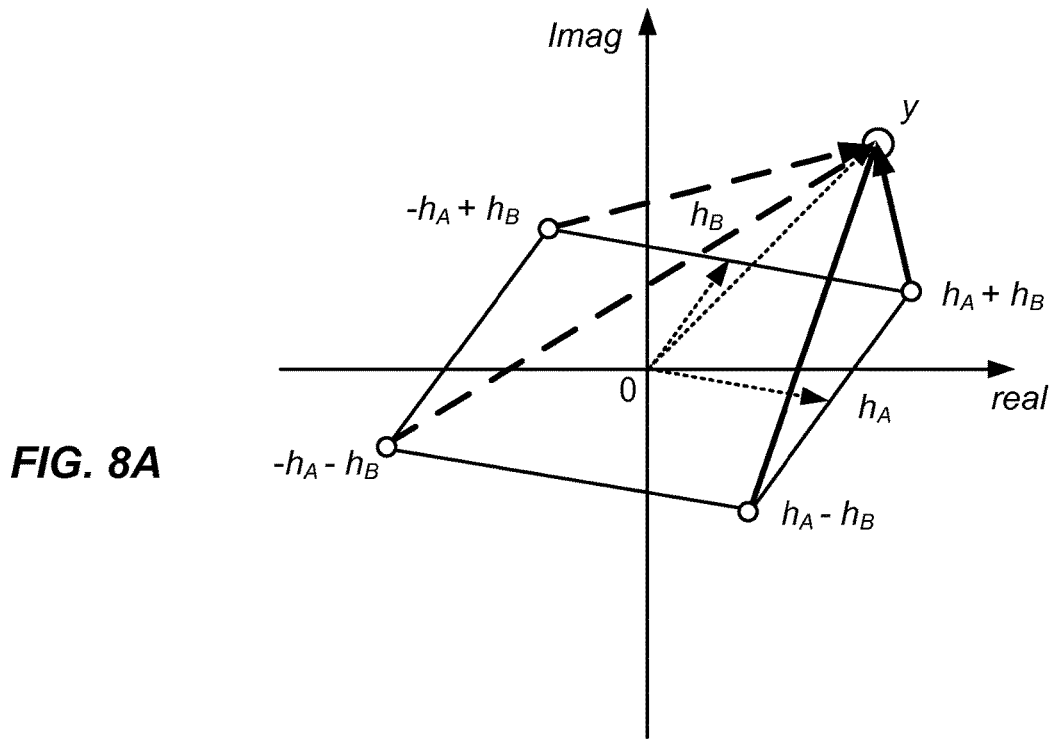
FIGS. 8A-B depict a reduced-constellation MUD soft demodulation for $X_B[k]$ according to some embodiments.
Figure 8B:
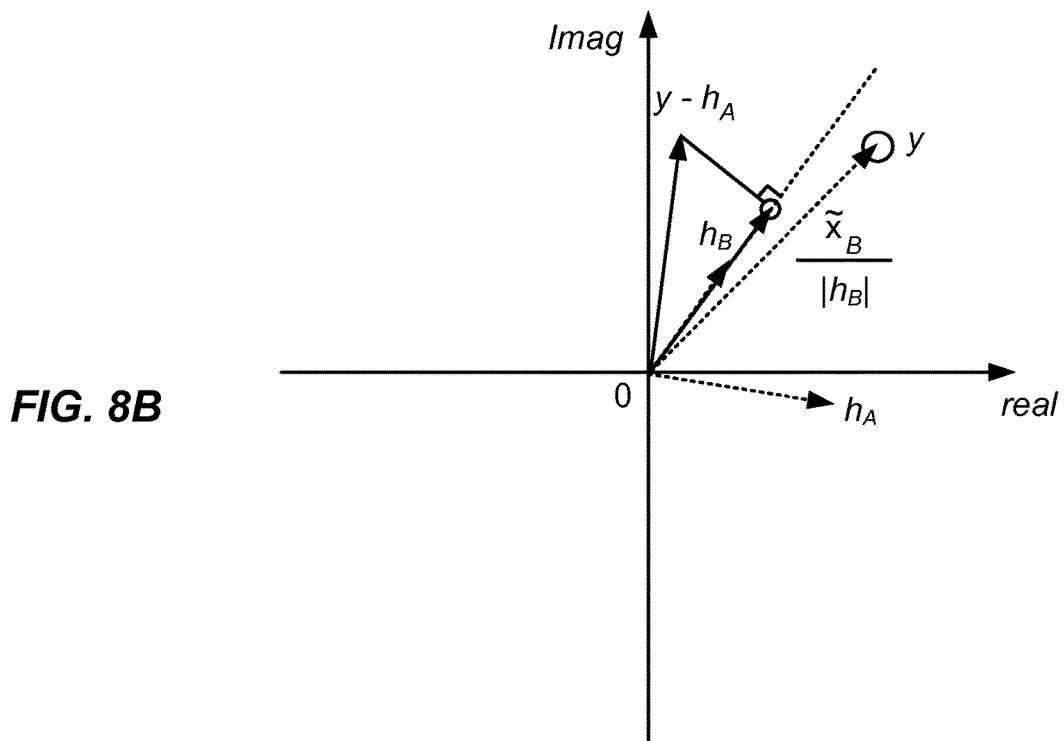

The procedure for obtaining $\tilde{x}_B$ is illustrated in FIG. 8. Election of Euclidean distances for $X_B[k]$ is shown in FIG. 8A; and a projection of $y-h_A$ onto $h_B$ to get the soft information $\tilde{x}_B$ is shown in FIG. 8B. Similarly, we can get $\tilde{x}_A \approx h_A \cdot (y-h_B)$ can be obtained, whose expression may be the same as that of $\tilde{x}_{A \oplus B}$ in (10) for this particular example, but with different physical meanings. As for the PNC modulator in the preceding section, in general there are also four cases to be considered for each of $\tilde{x}_A$ and $\tilde{x}_B$ (omitted hereto conserve space).

SIC:

With respect to (7), SIC tries to first decode a stronger signal, say $x_A$, and then substitutes the estimate for $x_A$, $\hat{x}_A$, into (7) to obtain $\tilde{y}=(y-h_A\hat{x}_A)/h_B=x_B+h_A(x_A-\hat{x}_A)/h_B+(n/h_B)$. If the overall codeword $\hat{X}_A$ is a valid codeword so that $\hat{X}_A=X^A$, then $y=x_B+(n/h_B)$. Thus the decoding of $X^B$ would be as if $X^A$ did not exist. If, on the other hand, $X^A$ is not decoded correctly, then $X^B$ may likely have decoding errors as well.

Although in principle, SIC should decode the stronger signal first, in some scenarios, better performance can be obtained by running two parallel SICs, with one decoding signal A first and the other decoding signal B first. For instance, due to other distortions and imperfection in channel estimation (in addition to noise), decoding the stronger signal first may not always be the best strategy (although most of time it can be). The SIC results described in Section 5 are based on this parallel version.

4.3 Quantization of Soft Information

Thus far, it has been assumed that the soft bit, $\tilde{x}$, is a real number. In some implementations, $\tilde{x}$ can be quantized before using VA. In particular, the VA decoder, in some implementations, can be based on the Spiral Viterbi software generator that accepts 8-bit inputs (from 0 to 255).

In mapping a real $\tilde{x}$ to an 8-bit quantized input, there can be a trade-off between clipping and quantization errors when determining where to put the constellation points of the signal within the quantized interval [0, 255]. A design that optimizes the trade-off point can be used.

5. Exemplary Implementation and Experimental Results

This section describes the details of a NCMA implementation over the USRP software radio platform, according to some embodiments.

5.1 Exemplary Implementation

According to some embodiments, full NCMA PHY-layer decoding algorithms, and both the MUD channel decoder and the PNC channel decoder (see FIG. 6) with real-time performance are implemented. To achieve real time decoding, the decoder designs have been simplified with approximations as explained in Section 4. The exemplary system makes use of USRP hardware and GNU Radio software with the UHD hardware driver. The RawOFDM single-user point-to-point OFDM transceiver software has been extended for the NCMA system. The extensions include:

a) Modifications of the single-user VA software for PHY-layer channel decoding in NCMA.
b) Modifications of the preamble and pilot designs. Different user nodes use orthogonal preambles and frequency-domain pilots so as to enable multiuser signal presence detection, multiuser channel estimation, and multiuser CFO tracking and compensation at the AP.
c) Partial precoding—Partial precoding at the user transmitters has been implemented to reduce the relative CFO between the two users at the AP. The transmitters of the two users make use of the preambles in the poll frames from the AP to estimate CFOs for precoding purposes. The relative CFO is small as a result (e.g., ~100-200 Hz).
d) CRC checking for PNC systems—The mathematics of CRC check for the single-user system with the 802.11 CRC design may not be directly applied to the PNC case in some embodiments, and thus the CRC for PNC error detection can be modified accordingly.
e) Polling mechanism—The AP uses beacons to poll users to transmit either singly or simultaneously. The signals from multiple users can reach the AP with arrival-time offset that is within the cyclic prefix (CP) of OFDM. Doing so can eliminate OFDM symbol offset between users, thus simplify the design. Time synchronization to within $10^{-6}$ s can be achieved, according to some embodiments.

5.2 Experimental Setup and Results

Figure 9:
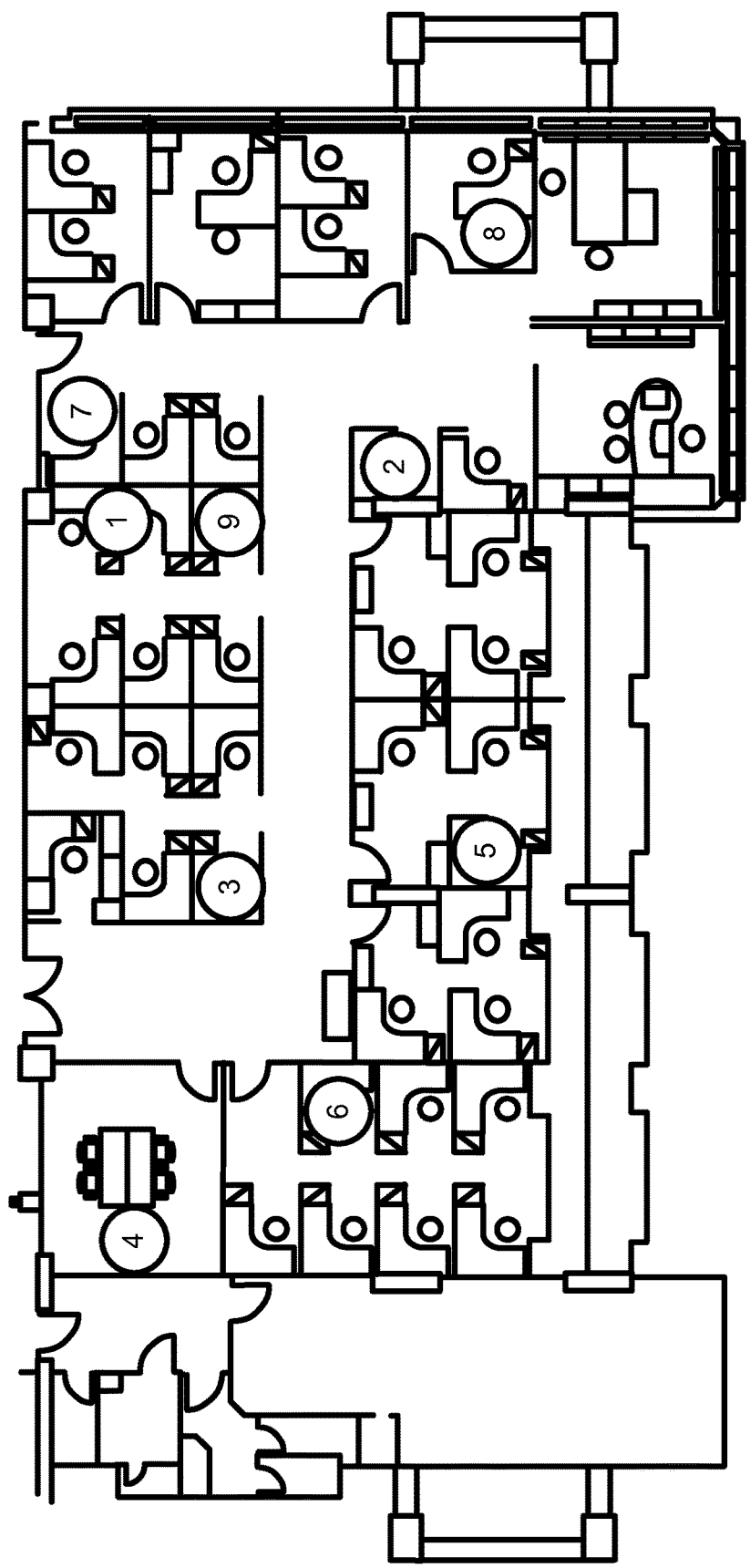
FIG. 9 depicts an example layout of an indoor environment for the deployment of 9 Universal Software Radio Peripheral (USRP) N210 nodes according to some embodiments.

According to some embodiments, 9 sets of USRP N210 with XCVR2450 boards are deployed indoor to emulate a WLAN system. The topology is shown in FIG. 9. Each node may be a USRP-connected PC. Each of the 9 nodes can be chosen to serve as the AP to test different network configurations. The AP can poll any two of the remaining 8 nodes to transmit together. BPSK modulation is used. Experiments were carried out at 802.11 channel 1 (i.e., 2.412 GHz) with 4 MHz bandwidth at midnight to minimize the co-channel interference from nearby ISM band equipment. The following systems are considered:

1) Single-User (SU) System

This is the traditional user-by-user non-overlapped transmission system. The same beacon mechanism as in NCMA is used to poll a pair of users; however, one user delays its transmission until the other user finishes transmission.

2) MUD System (Multi-User)

Here, the MUD decoder (and not the PNC decoder) is used for PHY-layer decoding. The MUD decoder can either be RMUD or SIC. Two equation systems, $Eq^A$ and $Eq^B$, are used to do the MAC-layer decoding for A and B separately. There is no PHY-layer bridging or MAC-layer bridging.

3) NCMA System (Multi-User)

In full NCMA, both MUD decoder (either RMUD or SIC) and PNC decoder are used at the PHY layer. All three equation systems $Eq^A$, $Eq^B$, and $Eq^{A \oplus B}$ are used for MAC-layer decoding. In particular, both PHY-layer bridging and MAC-layer bridging are performed in the decoding process.

5.2.1 PHY-Layer Packet Decoding Statistics

The PHY-layer decoding statistics, according to some embodiments, are illustrated in FIG. 10. Recall that with the combined use of MUD and PNC decoders in NCMA, there are 8 possible outcomes (see Section 2.2). To ease presentation of the results, some events in Section 2.2 are grouped together by the following notations in FIG. 10:

NONE=(iv)(II) (no packet decoded).
X=(iv)(I) (only XOR packet decoded).
A|B=(ii)(II)+(iii)(II) (either only packet A or only packet B decoded).
AX|BX=(ii)(I)=(iii)(I) (XOR packet plus either packet A or packet B decoded).
AB=(i)(I)+(i)(II) (both packets A and B decoded; XOR packet may or may not be decoded).

According to some embodiments, the APs may send 10,000 beacons to trigger simultaneous transmissions. The receive powers of nodes A and B at the AP are adjusted to be balanced, with less than 0.5 dB difference between the two powers. The "common" SNR from 7.5 dB to 10 dB can be varied. The illustrated results are from averaging 5 runs for each SNR. Recall from the discussion in Section 3 that the complementary XOR packets are useful for PHY-layer bridging and the lone XOR packets are useful for MAC-layer bridging. As shown in FIG. 10, there are considerable complementary XOR packets (AX|BX) and lone XOR packets (X) across all SNRs. At 8.5 dB, in particular, the events associated with complementary packets and lone packets both may happen more than 20% of the time. The contributions of these packets to the overall throughput of NCMA will become evident from the results presented next.

5.2.2 Overall NCMA Performance

Next, the overall NCMA performance is evaluated, with both PHY-layer decoding and MAC-layer decoding. For benchmarking, a theoretical upper bound for the overall NCMA normalized throughput imposed by the PHY-layer decoding performance is first derived. In each time slot, depending on the event, either one or two equations for use in our three equation systems at the MAC layer can be obtained. For example, when both packets A and B are obtained by PHY-layer decoding, then the normalized throughput for that particular time slot is 2. The upper bound for the normalized NCMA throughput averaged over all time slots can be shown to be (note: lone XOR packet also counts as 1 packet):

$$\text{Upper Bound} = 2 \times (Pr\{AB\} + Pr\{AX|BX\}) + 1 \times (Pr\{A|B\} + Pr\{X\}) \quad (13)$$

This upper bound may not exceed 2 in some embodiments when at most two users transmit together in such embodiments. It can be shown that even with MAC-layer bridging, this upper bound may not be exceeded.

Next, results showing that NCMA can achieve normalized throughput close to this upper bound are described. Trace-driven simulations are used. Specifically, the PHY-layer event statistics are gathered, and then the traces are used to drive the events in the simulations. For NCMA, after each message is decoded, the associated node of that message begins sending another message, paired with the yet-to-be decoded message of the other node (see explanation in Section 3.2.5).

Figure 11:
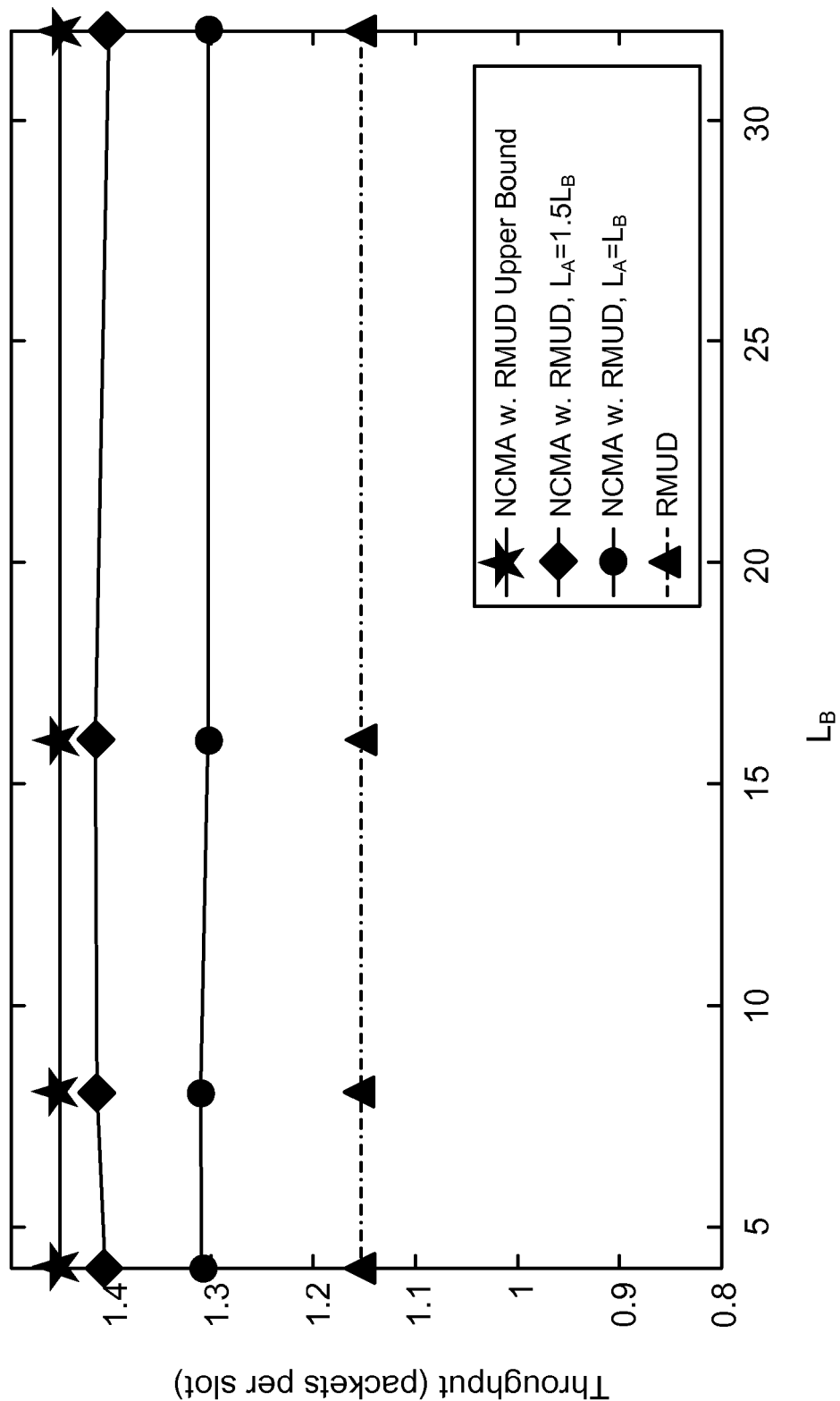
FIG. 11 depicts a throughput comparison of different schemes with different Reed Solomon code parameters, $L_B$=4, 8, 16, 32, and fixed $SNR_A$=$SNR_B$=9 dB according to some embodiments.

In FIG. 11, the normalized throughputs of various schemes at SNR=9 dB, according to some embodiments, are shown. In the figure, $L_A$ ($L_B$) is the number of PHY-layer packets that the MAC layer of node A (B) must have before each message $M^A$ ($M^B$) can be decoded. The normalized throughput is defined as $Th = (N_A + N_B)/N_{Beacon}$, where $N_A$ ($N_B$) and $N_{Beacon}$ are the total number of recovered MAC-layer packets from node A (B), and the total number of beacons, respectively. As can be seen from FIG. 11, NCMA with RMUD outperforms RMUD without the PNC decoder by 20%.

Note that making $L_A \neq L_B$ can improve performance. In particular, making $L_A = 1.5 L_B$ allows NCMA throughput to approach the upper bound. The reason that unequal L is better is as follows. With respect to MAC-layer bridging, suppose that MB is decoded first. As explained in Section 3.2, with the decoded MB, MAC-layer bridging may allow additional equations associated with MA to be obtained through lone XOR packets. Each lone XOR packet yields one more equation for MA. When $L_A = L_B$, the number of lone XOR packets may be "more than enough" (i.e., more than $L_A$ equations after bridging can be obtained). The extra lone XOR packets are then wasted, because they do not contribute to the throughput. By contrast, in the upper bound formula, each lone XOR packet contributes 1 unit to the throughput. Thus, each wasted lone packet pulls the throughput further away from the upper bound. Thus, it may be better for $M^A$ not to be decoded at exactly the same time as $M^B$, in which case all the lone XOR packets contribute to the throughput. Making $L_A = 1.5 L_B$ misaligns the decoding times of $M^A$ and $M^B$ and ensures this is more likely to be the case. It should be understood that other misalignment strategies for the messages are also possible.

Figure 12:
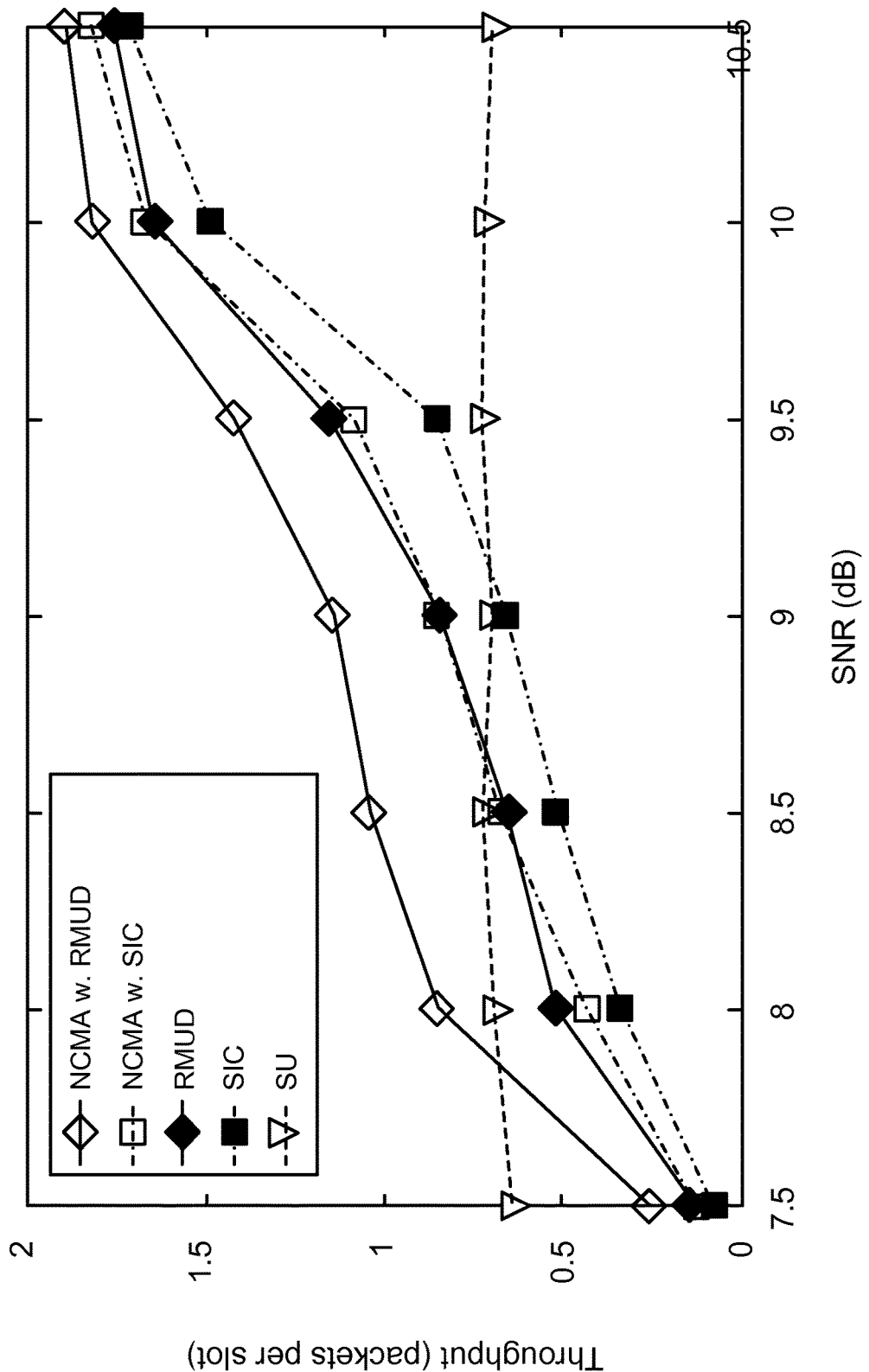
FIG. 12 depicts a throughput comparison of different schemes for different SNRs ($SNR_A$=$SNR_B$) with $L_A$=1.5× $L_B$=24 according to some embodiments.

As can be seen from FIG. 11, as long as $L_A = 1.5 L_B$, the absolute value of $L_B$ is not critical. Next, $L_B = 16$ is fixed and the SNR is varied. FIG. 12 shows that NCMA outperforms SU by 100% when the average SNR≥9.5 dB. At SNR≥9.5 dB according to some embodiments, and that NCMA may have significantly better performance than RMUD and SIC without the PNC decoder. When SNR>10.5 dB, all multiuser schemes (including MUD and NCMA) have good performance and they start to converge to throughput of 2. FIG. 12 also includes the results for NCMA with SIC. The performance for NCMA with SIC may not be as good as that of NCMA with RMUD. This is understandable because FIG.

12 concerns the balanced-power case, and SIC may have poor performance when powers from different users are balanced.

5.2.3 Effects of Unbalanced-Power User Pairing

Next, the scenario when the receive powers of users A and B are different is explored.

Figure 13A:
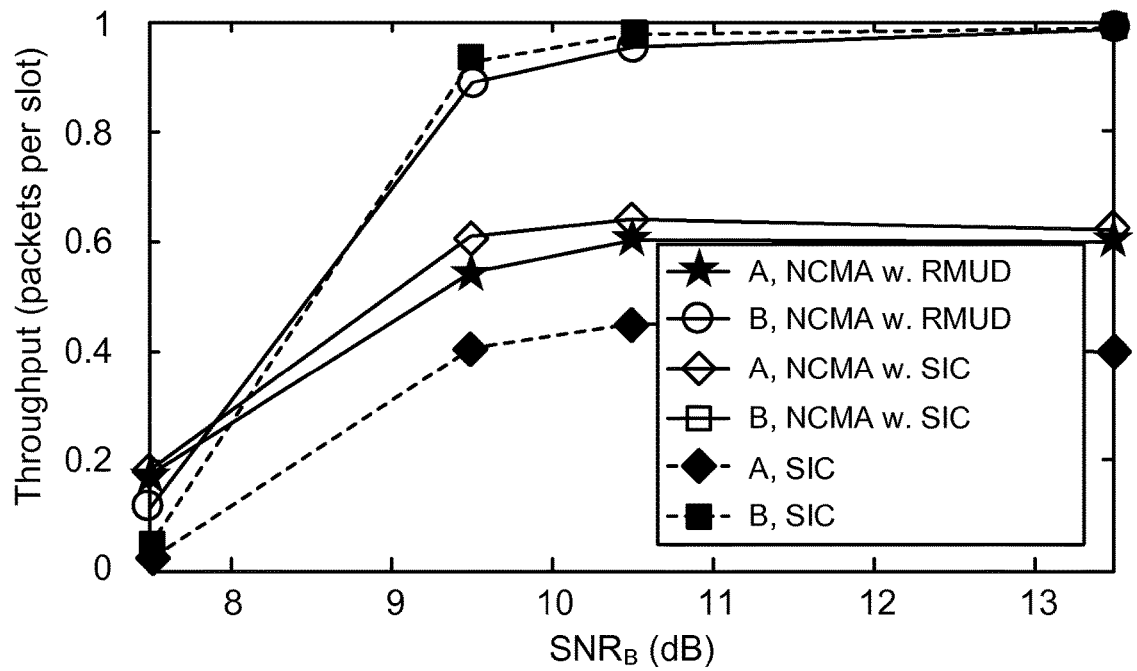
FIGS. 13A-B depicts throughputs of node A and node B with SNR of node A fixed at (a) $SNR_A$=7.5 dB, (b) $SNR_A$=9.5 dB, and with SNR of node B varied according to some embodiments.
Figure 13B:
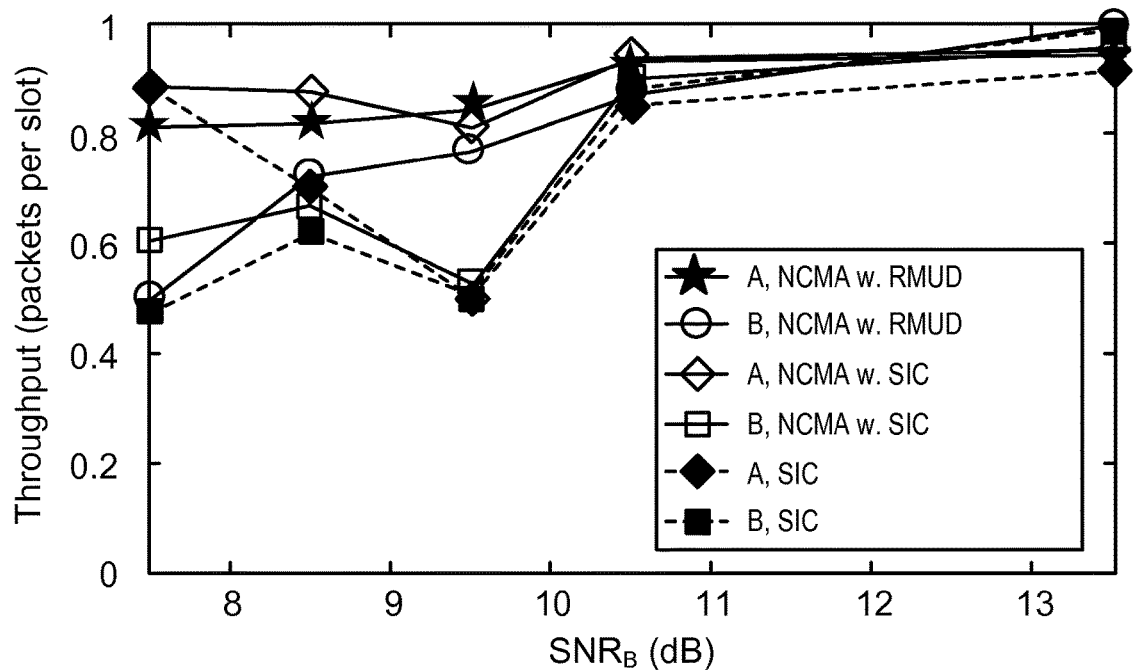

The NCMA is not only robust against power imbalance, but its performance can actually be better under unbalanced-power user pairing. FIG. 13 illustrates the results according to some embodiments. The SNR of A was fixed to be 7.5 dB and 9.5 dB in FIG. 13A and FIG. 13B, respectively. For each fixed power, the SNR of B is varied. Note that for a fixed $SNR_A$, as $SNR_B$ increases, not only the throughput of B improves, the throughput of A also improves. For example, when $SNR_A$ is fixed at 7.5 dB, the throughput of A could be improved by 400% as $SNR_B$ increases from 7.5 dB to 8.5 dB. To better analyze the results, the following notations are used:

($Th'_A$, $Th'_B$)>>($Th_A$, $Th_B$) means $Th'_A$>$Th_A$ and $Th'_B$>$Th_B$.
($Th'_A$, $Th'_B$)< >($Th_A$, $Th_B$) means $Th'_A$<$Th_A$ and $Th'_B$>$Th_B$.
($Th'_A$, $Th'_B$)><($Th_A$, $Th_B$) means $Th'_A$>$Th_A$ and $Th'_B$<$Th_B$.
$Th^{NR}$=($Thr_A^{NR}$, $Th_B^{NR}$) stands for Throughputs of NCMA-RMUD.
$Th^{NS}$=($Th_A^{NS}$, $Th_B^{NS}$) stands for Throughputs of NCMA-SIC.
$Th^S$=($Th_A^S$, $Th_B^S$) stands for Throughputs of SIC.

FIG. 13B, where $SNR_A$=9.5 dB, will now be discussed for the analysis of the power imbalance benefits in NCMA. At $SNR_B$=7.5 dB, NCMA-SIC has the best performance, i.e., $Th^{NS}$>>$Th^{NR}$ and $Th^{NS}$>>$Th^S$. In particular, there is an appreciable gap between $Th_B^{NS}$ and $Th_B^S$, implying the use of PNC decoder that makes possible both PHY-layer bridging and MAC-layer bridging can improve the performance of the weak user significantly. At $SNR_B$=8.5 dB, both $Th^{NS}$>>$Th^S$ and $Th^{NR}$>>$Th^S$. Using SIC alone without the PNC decoder will result in inferior performance, meanwhile, $Th^{RS}$< >$Th^{NS}$. This indicates that using SIC and RMUD in combination at the PHY-layer decoding may improve performance. At $SNR_B$=9.5 dB, the balanced power case is explored. Clearly, $Th^{NR}$>>$Th^{NS}$ and $Th^{NR}$>>$Th^S$, indicating that RMUD is a good complement to SIC so that the limitations of the SIC, the balanced power case, can be overcome. At $SNR_B$≥10.5 dB, both NCMA-RMUD and NCMA-SIC have good performance. Overall, NCMA-RMUD has the "smoothest performance" (no large fluctuations in performance) when $SNR_B$ is varied.

5.2.4 Which NCMA Variants to Use

The results described herein have validated the use of PNC decoding in multi-access system. Overall, NCMA-RMUD and NCMA SIC, in which PNC decoding is used, have better performance than the corresponding RMUD and SIC, respectively.

TABLE 1

User pairing in random topology

| User Pair | User A | User B |
|---|---|---|
| P1 | Location 1 (20 dB) | Location 2 (12.3 dB) |
| P2 | Location 2 (12.3 dB) | Location 3 (9 dB) |
| P3 | Location 3 (9 dB) | Location 4 (7 dB) |
| P4 | Location 4 (7 dB) | Location 5 (7.4 dB) |
| P5 | Location 2 (12.3 dB) | Location 5 (7.4 dB) |

FIG. 13B indicates that compared with NCMA-SIC, NCMA-RMUD has smoother performance transition from the unbalanced power setting to the balanced power setting. That is, it works well for both settings and is more robust if the system does not allow fine-tuning the relative powers of user pairs. Furthermore, SIC may require a second round of PHY decoding after interference cancellation (which introduces processing delay), while RMUD performs all decoding in one round. Thus, in some embodiments, for a simple implementation that has low latency and good performance across all relative power settings, NCMA-RMUD can be used. However, in some embodiments, if complexity and latency are not an issue, then NCMA that uses both RMUD and SIC (rather than just one of them) may have the best throughput performance and can be used.

5.2.5 Random Topology

Figure 14A:
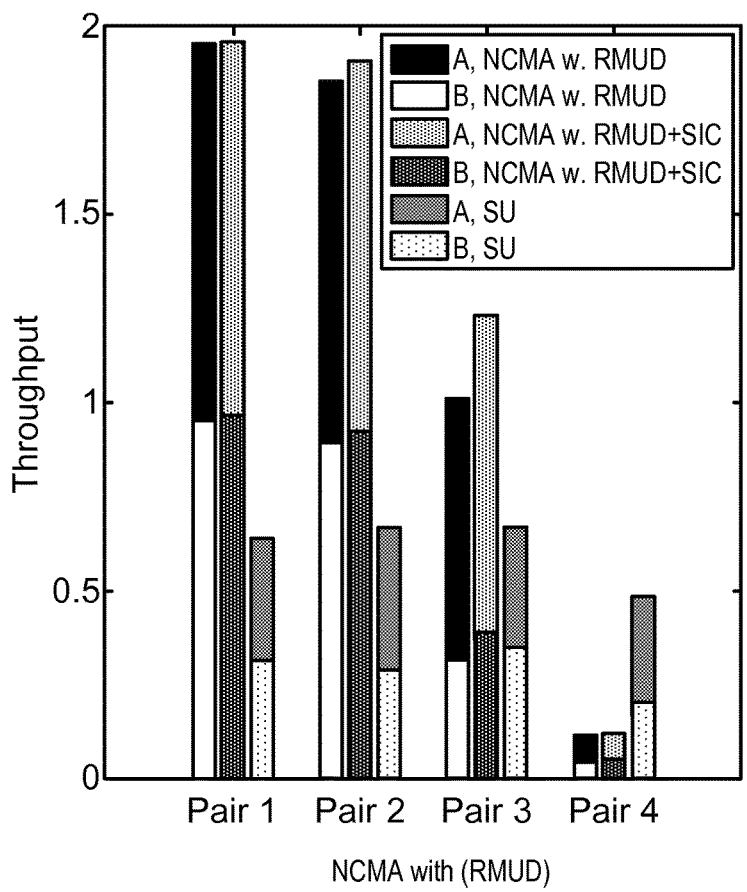
FIGS. 14A-C depicts throughputs with the access point placed at a location in FIG. 9 above, according to some embodiments, including: (a) throughputs of four user pairs, P1, P2, P3, and P4 in Table I under NCMA and single-user system; (b) throughputs of two different user-pairing strategies under NCMA with the reduced-constellation MUD (RMUD); and (c) throughputs of two different user-pairing strategies under NCMA with RMUD plus successive interference cancellation (SIC).
Figure 14B:
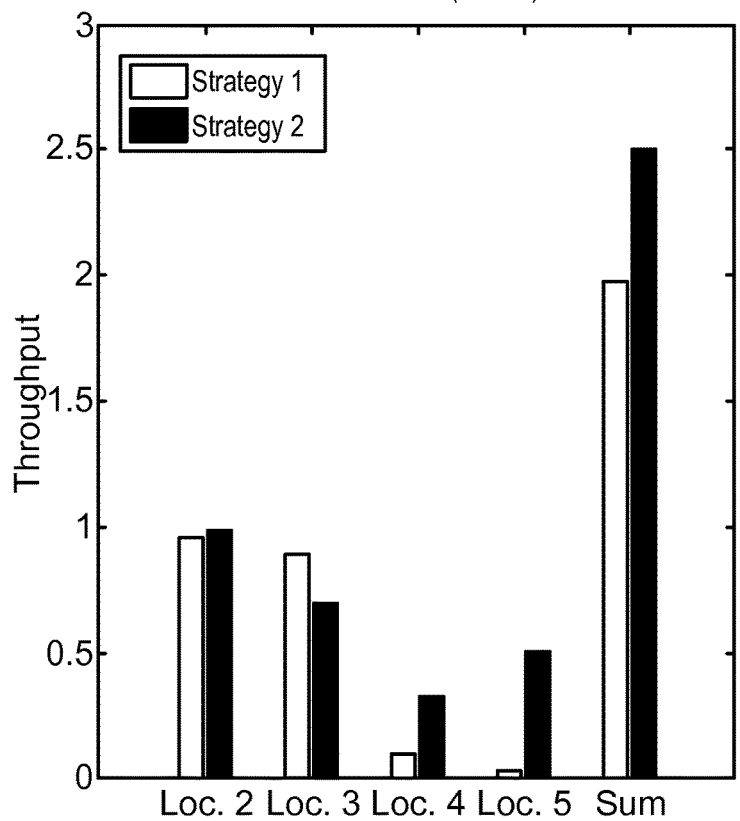
Figure 14C:
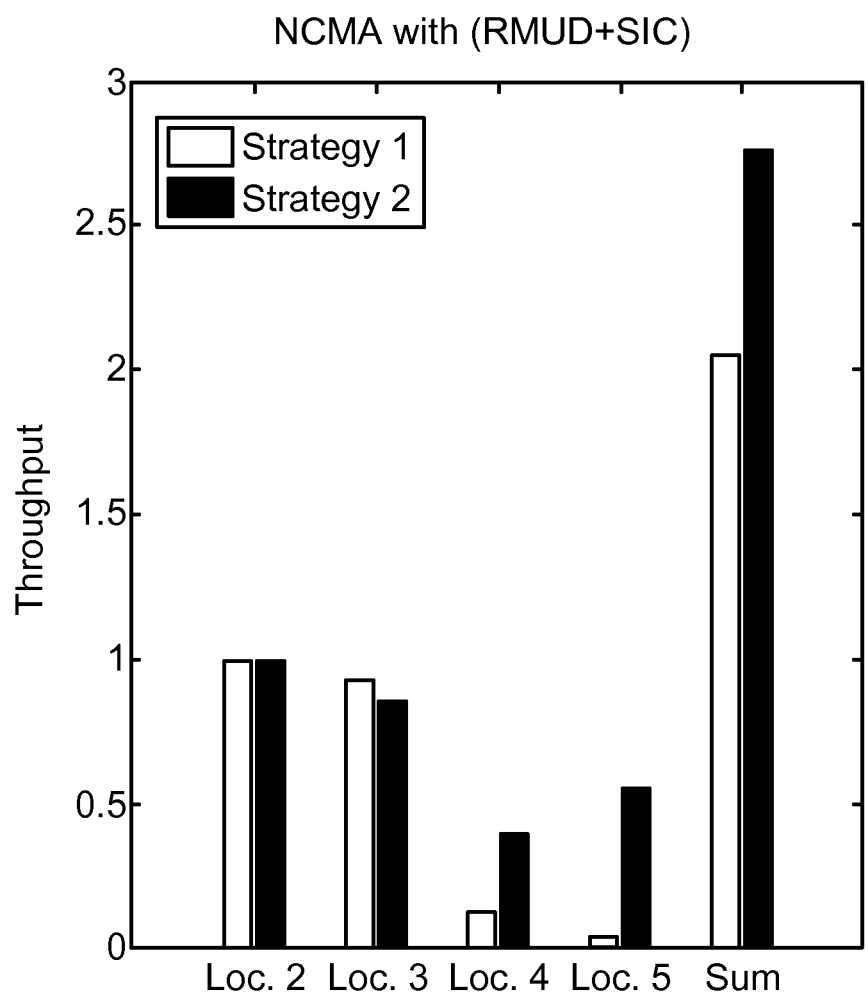

The results of NCMA with RMUD, and NCMA with both RMUD and SIC, for a random topology according to some embodiments will now be described. The random topology is constructed from the set-up in FIG. 9, without deliberate power control, i.e., the USRPs are placed in different locations in an indoor environment, and each of them uses a fixed transmit power. The results with the AP placed at location 9 in FIG. 9 is described. Users are placed at locations 1, 2, 3, 4, and 5. The associated SNRs for these locations are 20 dB, 12.3 dB, 9 dB, 7 dB, and 7.4 dB, respectively. Five user pairs P1, P2, P3, P4, and P5 as shown in Table 1 are formed for experimentation purposes. FIG. 14A illustrates throughputs of four user pairs, P1, P2, P3, and P4 in Table I under NCMA and single-user system; FIG. 14B illustrates throughputs of two different user-pairing strategies under NCMA with RMUD; and FIG. 14C illustrates throughputs of two different user-pairing strategies under NCMA with (RMUD+SIC).

FIG. 14A shows the throughputs of different user pairs P1, P2, P3, and P4, under NCMA and SU, according to some embodiments. In some embodiments, the NCMA outperforms SU significantly, except for P4. The overall system throughput improvement of NCMA over SU is 100%. In P1, P2, and P3, although the powers are unbalanced, at least one of the users has decent power. It is also noted the power-unbalanced P1, P2, and P3, NCMA with RMUD and SIC may have slightly better performance than NCMA with RMUD. In P4, the powers of both users are low.

The above observation on P1, P2, P3, and P4 indicates that it may be better to pair a user with strong power with a user weak power. To better illustrate this, consider a situation in which there are four users in the network at locations 2, 3, 4, and 5. Two strategies of user pairing are compared. In Strategy 1, the user pairs P2 and P4 out of the four users are formed; in Strategy 2, user pairs P3 and P5 are formed. As shown in FIG. 14B-C, Strategy 2 has better overall performance. Note that in Strategy 2, pairing two weak users together as in P4 of Strategy 1 is avoided. As a result, the throughputs of the two weak users at locations 4 and 5 are pulled up significantly by their stronger partners. Not only is Strategy 2 fairer, its overall system throughput is also 20% higher than that of Strategy 1, according to some embodiments.

5.2.6 Further Improvements

The performance of a NCMA system based on the BPSK modulation, with SNRs ranging from 7 dB to 10.5 dB has been described. The highest normalized throughput may be bounded by 2 because at most two users may be allowed to transmit concurrently. In some embodiments, the throughput can be further increased by allowing more than two users to transmit together. It is also noted that when the SNRs are higher than 10 dB, higher order modulations (e.g., 16-QAM) could be applied to better utilize the available power. For SNR below 7 dB, some decoders may not work well due to the approximation methods adopted. As discussed herein, pairing a weak user with a strong user can substantially alleviate this problem. An alternative approach may be to refine the approximation methods so that the decoders also work well when both users have low SNRs.

6. Additional Embodiments

Network coding ("NC") has been implemented and evaluated in wireless networks at the PHY layer and the network layer. However, the previous studies of NC have generally been restricted to relay networks, where NC was originally shown to be helpful for packet exchange via relays. NCMA, on the other hand, targets the non-relay setting. NC has also found use in packet retransmission. NCMA, by contrast, aims at packet transmission rather than retransmission. Instead of discarding the collided packets, a set of linear equations are formed to exploit information contained in them. In some embodiments, the decoding may be based on PHY-layer equations only. In addition, the decoding methods can be either pure MUD or pure PNC methods. By contrast, NCMA introduces correlations among PHY packets so that another layer of MAC decoding can be used to improve performance. Also, NCMA makes use of both MUD and PNC at the PHY layer in a complementary way. In OFDMA, different users transmit their signals on different subcarriers. In contrast, for NCMA, multiple users use the same set of subcarriers when they transmit concurrently. This may improve spectrum efficiency. There may be overlapped subcarriers between two users; however, at least some of the subcarriers may be non-overlapping for successful packet recovery. Similarly, as a time-domain WLAN system, the set-up may have some symbols non-overlapping in time to bootstrap the packet recovery algorithm. Interference cancellation techniques have been advanced and applied to the decoding of PHY-layer rateless codes. For these techniques, the processing is entirely on signal samples rather than on bits. While having good performance, the decoding procedure could incur considerable storage and computation costs. NCMA opts for reduced complexity for simple PHY-layer decoding with real-time performance. The correlations among different PHY packets can be used in MAC-layer decoding, which deals with bits rather than samples. The techniques described herein can be compatible with the processing flows of the current wireless standards (e.g., 802.11).

Accordingly, embodiments of a WLAN system that uses both PNC and MUD to decode concurrent transmissions by multiple users have been described, with a throughput gain of 100% relative to the traditional single-user transmission system at medium SNR (10 dB).

Figure 15:
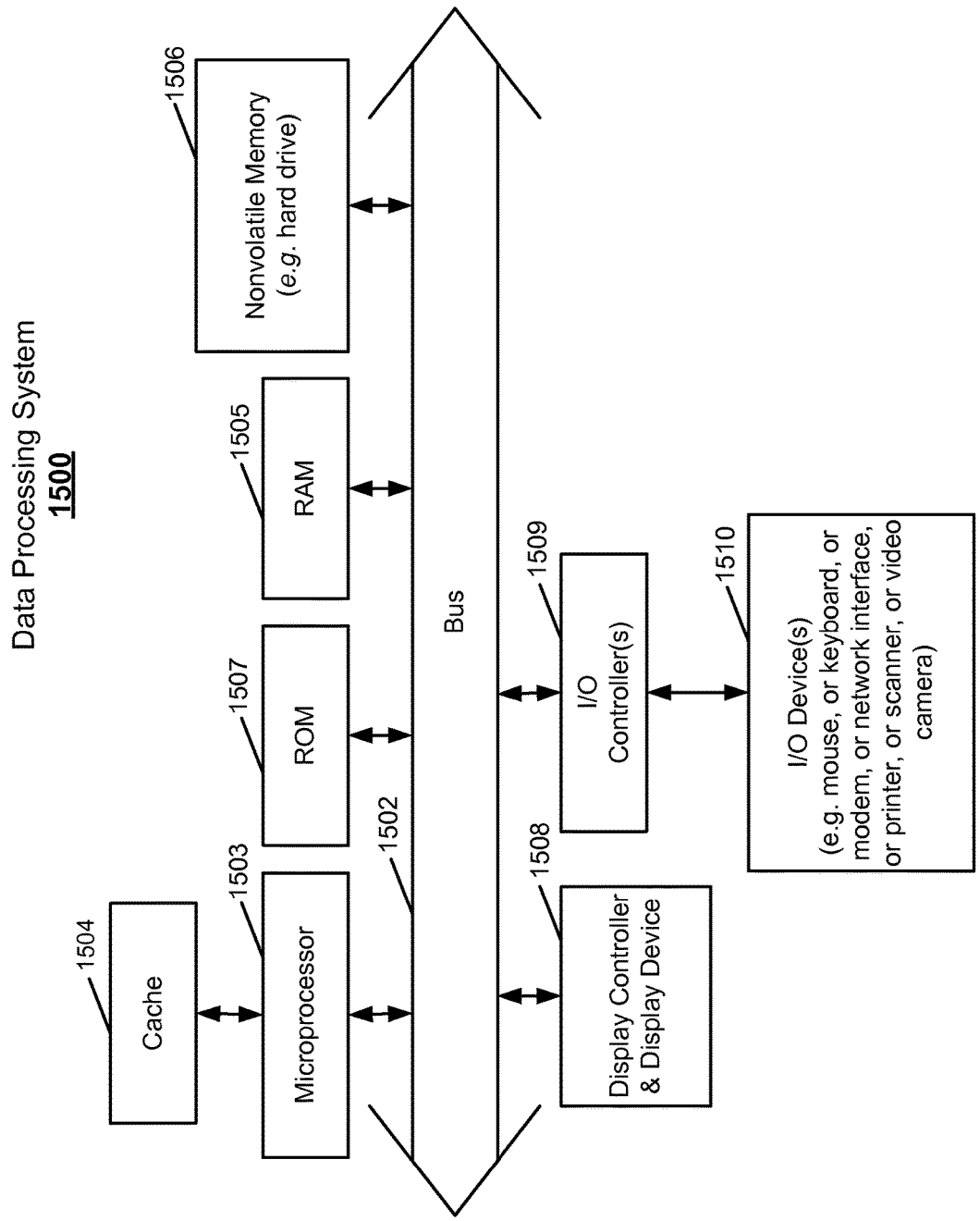
FIG. 15 depicts an example block diagram of a data processing system according to some embodiments.

FIG. 15 depicts an example block diagram of a data processing system upon which the disclosed embodiments may be implemented. Embodiments of the present invention may be practiced with various computer system configurations such as hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network.

FIG. 15 shows one example of a data processing system, such as data processing system 1500, which may be used with the present described embodiments. Note that while FIG. 15 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 15 may, for example, a personal computer (PC), workstation, tablet, smartphone or other hand-held wireless device, or any device having similar functionality.

As shown, the data processing system 1501 includes a system bus 1502 which is coupled to a microprocessor 1503, a Read-Only Memory (ROM) 1507, a volatile Random Access Memory (RAM) 1505, as well as other nonvolatile memory 1506. In the illustrated embodiment, microprocessor 1503 is coupled to cache memory 1504. System bus 1502 can be adapted to interconnect these various components together and also interconnect components 1503, 1507, 1505, and 1506 to a display controller and display device 1508, and to peripheral devices such as input/output ("I/O") devices 1510. Types of I/O devices can include keyboards, modems, network interfaces, printers, scanners, video cameras, or other devices well known in the art. Typically, I/O devices 1510 are coupled to the system bus 1502 through I/O controllers 1509. In one embodiment the I/O controller 1509 includes a Universal Serial Bus ("USB") adapter for controlling USB peripherals or other type of bus adapter.

RAM 1505 can be implemented as dynamic RAM ("DRAM") which requires power continually in order to refresh or maintain the data in the memory. The other nonvolatile memory 1506 can be a magnetic hard drive, magnetic optical drive, optical drive, DVD RAM, or other type of memory system that maintains data after power is removed from the system. While FIG. 15 shows that nonvolatile memory 1506 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable storage medium embodied in computer hardware or a computer program product. Computer-readable media can be adapted to store computer program code, which when executed by a computer or other data processing system, such as data processing system 1500, is adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A two-layer decoding method in a wireless local area network ("WLAN") comprising:
   receiving a pair of overlapping packets at a network element in the WLAN transmitted concurrently from multiple users;
   communicating the pair of overlapping packets to a physical layer decoding unit comprising a multi-user decoding ("MUD") decoder and a physical layer network coding ("PNC") decoder, wherein the MUD decoder is adapted to attempt to decode each individual packet of the pair of overlapping packets, and the PNC decoder is adapted to attempt to decode a network-coded packet derived from the pair of overlapping packets transmitted from the multiple users and received at the network element;
   decoding a first packet of the pair of overlapping packets using physical-layer bridging when only a second packet of the pair of overlapping packets and the network-coded packet are decoded; and
   attempting to recover each of the pair of packets based on results obtained from the physical layer decoding unit.

2. The method of claim 1 further comprising obtaining the pair of overlapping packets from network-coded packets using a media access control ("MAC") layer bridging technique in a MAC layer decoder.

3. The method of claim 2 wherein the MAC layer bridging technique comprises:
   decoding enough packets of a first message to obtain a source message corresponding to the first packet; and
   deriving remaining missing packets from previous transmissions of the packets of the first message using the source message.

4. The method of claim 3 further comprising deriving the remaining missing packets from previous transmissions of the first message by re-encoding its decoded packets.

5. The method of claim 2 further comprising using an erasure channel code that includes a Reed Solomon code or a rateless channel code at the MAC layer decoder.

6. The method of claim 1 wherein the network-coded packet is a bitwise XOR function of the pair of overlapping packets.

7. The method of claim 1 wherein the pair of overlapping packets are transmitted simultaneously.

8. The method of claim 1 further comprising using the network-coded packet at the physical layer decoding unit as a bridge to derive a missing packet of the pair of overlapping packets when its counterpart packet of the pair of overlapping packets is decoded.

9. The method of claim 1 further comprising detecting multi-user presence using orthogonal preambles within the pair of overlapping packets and estimating the channel gains of overlapping packets.

10. A system for two-layer decoding in a wireless local area network ("WLAN") comprising:
    a receiver in the WLAN configured to receive a pair of overlapping packets transmitted concurrently from multiple users;
    a physical layer decoder adapted to:
       receive the pair of overlapping packets as inputs, the physical layer decoder comprising a multi-user decoding ("MUD") decoder and a physical layer network coding ("PNC") decoder, wherein the MUD decoder is adapted to attempt to decode each individual packet of the pair of overlapping packets and the PNC decoder is adapted to attempt to decode a network-coded packet derived from the pair of overlapping packets transmitted from the multiple users and received at the receiver, wherein a first packet of the pair of overlapping packets is decoded using physical-layer bridging when only a second packet of the pair of overlapping packets and the network-coded packet are decoded; and
       attempt to recover each of the pair of overlapping packets based on results obtained from the MUD decoder and the PNC decoder.

11. The system of claim 10 wherein the pair of overlapping packets is obtained from the network-coded packet using a media access control ("MAC") layer bridging technique in a MAC layer decoder.

12. The system of claim 11 wherein the MAC layer decoder uses an erasure channel code that includes a Reed Solomon code or a rateless channel code.

13. The system of claim 10 wherein the network-coded packet is a bitwise XOR function of the pair of overlapping packets.

14. The system of claim 10 wherein the pair of overlapping packets are transmitted simultaneously.

15. The system of claim 10 wherein the physical layer decoder is adapted to use the network-coded packet as a bridge to derive a missing packet of the pair of overlapping packets when its counterpart packet of the pair of overlapping packets is decoded.

16. The system of claim 10 wherein the physical layer decoder is adapted to use orthogonal preambles within the pair of overlapping packets for detecting multi-user presence and for estimating the channel gains of overlapping packets.

17. The method of claim 2 further comprising using the network-coded packet at the MAC layer decoder as a bridge to derive a missing packet of the pair of overlapping packets when its counterpart packet of the pair of overlapping packets is recovered using MAC-layer channel codes.

18. The system of claim 11 wherein the MAC layer decoder uses the network-coded packet as a bridge to derive a missing packet of the pair of overlapping packets when its counterpart packet of the pair of overlapping packets is recovered using MAC-layer channel codes.

* * * * *